(12) United States Patent
Okada et al.

(10) Patent No.: US 7,613,379 B2
(45) Date of Patent: Nov. 3, 2009

(54) RECORDING AND REPRODUCTION APPARATUS, RECORDING APPARATUS, EDITING APPARATUS, INFORMATION RECORDING MEDIUM, RECORDING AND REPRODUCTION METHOD, RECORDING METHOD, AND EDITING METHOD

(75) Inventors: Takanori Okada, Toyonaka (JP); Yoshiho Gotoh, Osaka (JP); Tatsushi Bannai, Sakai (JP)

(73) Assignee: Panasonic Corporation, Kadoma (JP)

( * ) Notice: Subject to any disclaimer, the term of this patent is extended or adjusted under 35 U.S.C. 154(b) by 635 days.

(21) Appl. No.: 10/540,631

(22) PCT Filed: Oct. 9, 2003

(86) PCT No.: PCT/JP03/13015

§ 371 (c)(1),
(2), (4) Date: Mar. 17, 2006

(87) PCT Pub. No.: WO2004/059650

PCT Pub. Date: Jul. 15, 2004

(65) Prior Publication Data

US 2006/0216002 A1 Sep. 28, 2006

(30) Foreign Application Priority Data

Dec. 24, 2002 (JP) .............................. 2002-372231

(51) Int. Cl.
*H04N 5/91* (2006.01)
*H04N 7/00* (2006.01)
*G11B 27/00* (2006.01)
*H04N 5/93* (2006.01)
*H04N 7/26* (2006.01)
*H04N 5/00* (2006.01)

(52) U.S. Cl. .................. 386/46; 386/124; 386/125; 386/126; 386/52

(58) Field of Classification Search ............... 386/1, 386/46, 52, 95, 125–126
See application file for complete search history.

(56) References Cited

U.S. PATENT DOCUMENTS

| 6,263,150 B1 * | 7/2001 | Okada et al. ................ 386/52 |
| 2001/0036355 A1 | 11/2001 | Moris et al. |
| 2002/0071659 A1 | 6/2002 | Ando et al. |

FOREIGN PATENT DOCUMENTS

EP 0 869 679 A 10/1998

OTHER PUBLICATIONS

International Search Report for corresponding Application No. PCT/JP2003/013015, mailed Jun. 1, 2004.

(Continued)

*Primary Examiner*—Marsha D Banks Harold
*Assistant Examiner*—Marc Dazenski
(74) *Attorney, Agent, or Firm*—Renner, Otto, Boisselle & Sklar, LLP

(57) ABSTRACT

A recording and reproduction apparatus includes a first decoding section for outputting first decoded data generated by decoding the first data; a second decoding section for outputting second decoded data generated by decoding the second data; and a control section for calculating a first time period, from a start point of a seek operation of the reading section from the read finish point of first data to the read start point of second data until the first decoding section completes output of the first decoded data, and a second time period, from the start point of the seek operation until the second decoded data is allowed to be output by the second decoding section; and comparing a length of the calculated first time period and a length of the calculated second time period.

29 Claims, 24 Drawing Sheets

OTHER PUBLICATIONS

Hurst N. et al.; "MPEG Splicing: A New Standard for Television—SMPTE 312M"; Nov. 1998, SMPTE Journal, SMPTE Inc., Scarsdale, NY; pp. 978-988, XP000804761.

Hurst N. et al.; "MPEG Splicing: A New Standard for Television—SMPTE 312M"; Nov. 1998, SMPTE Journal, SMPTE Inc., Scarsdale, NY; pp. 978-988, XP000804761.

* cited by examiner

FIG.10
(a) 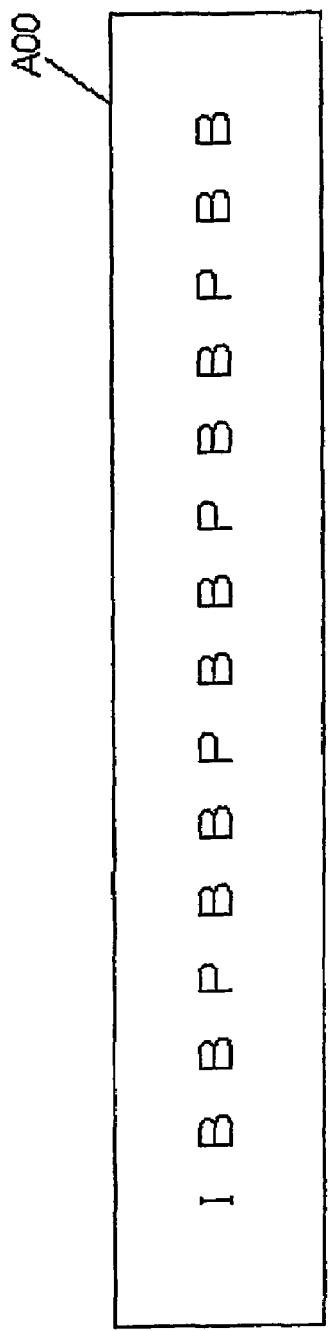
(b) 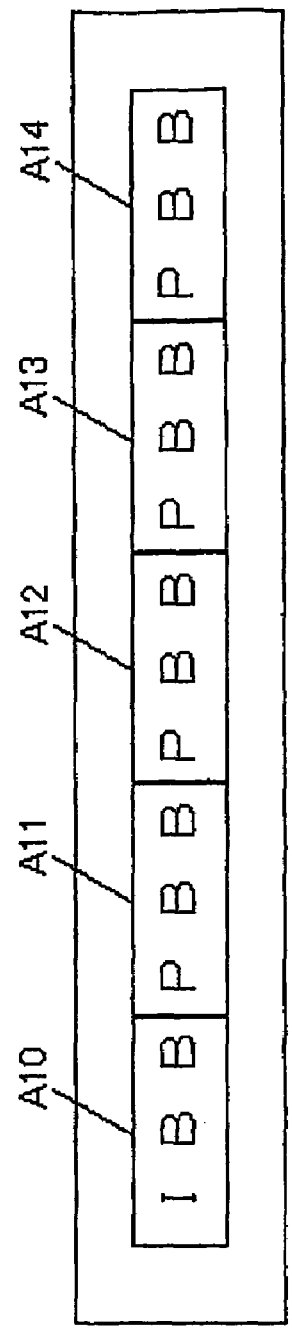
(c) 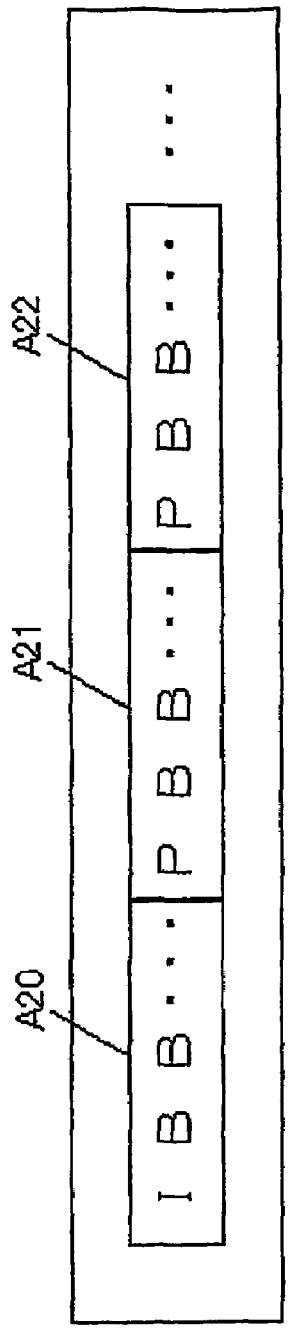

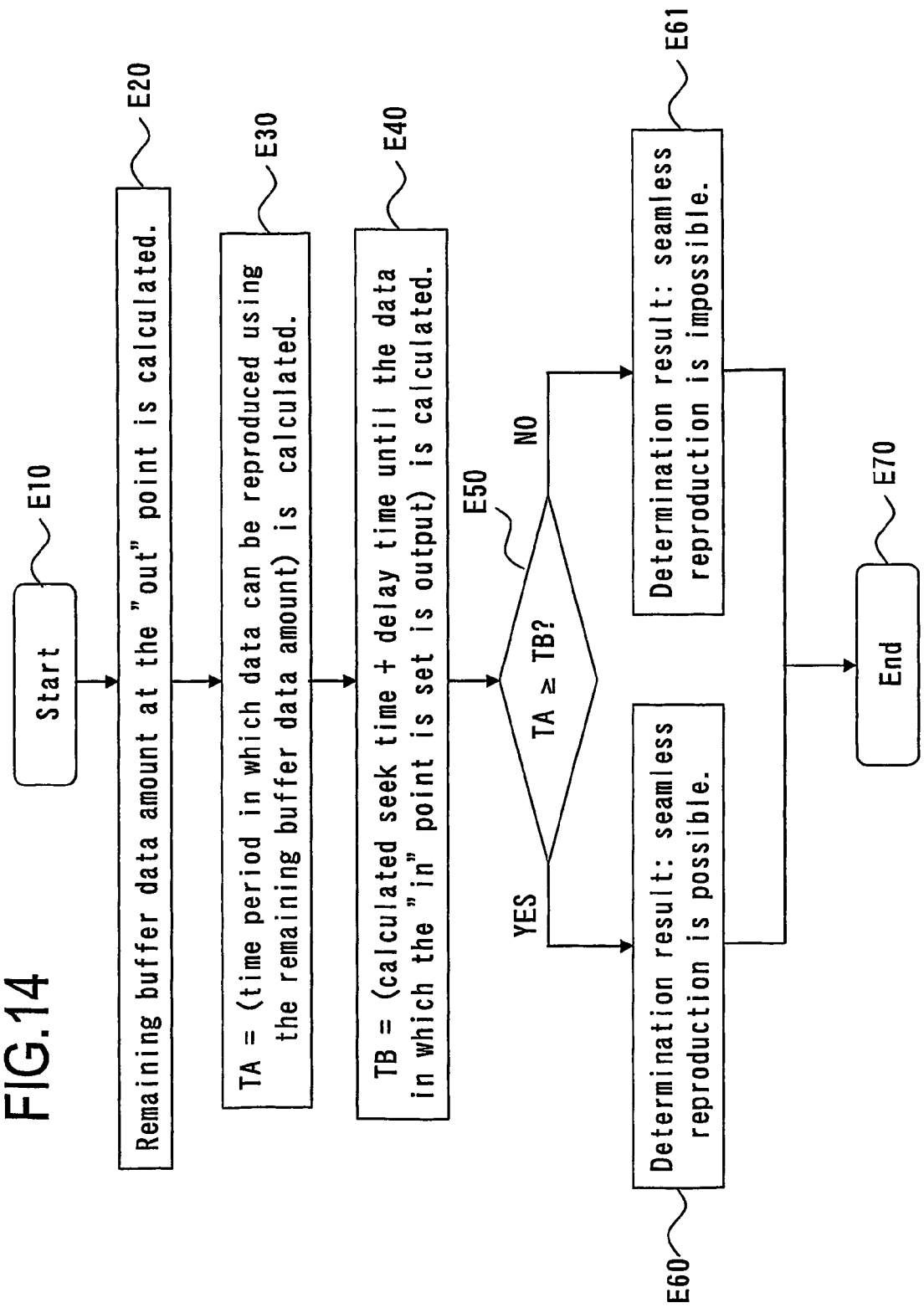

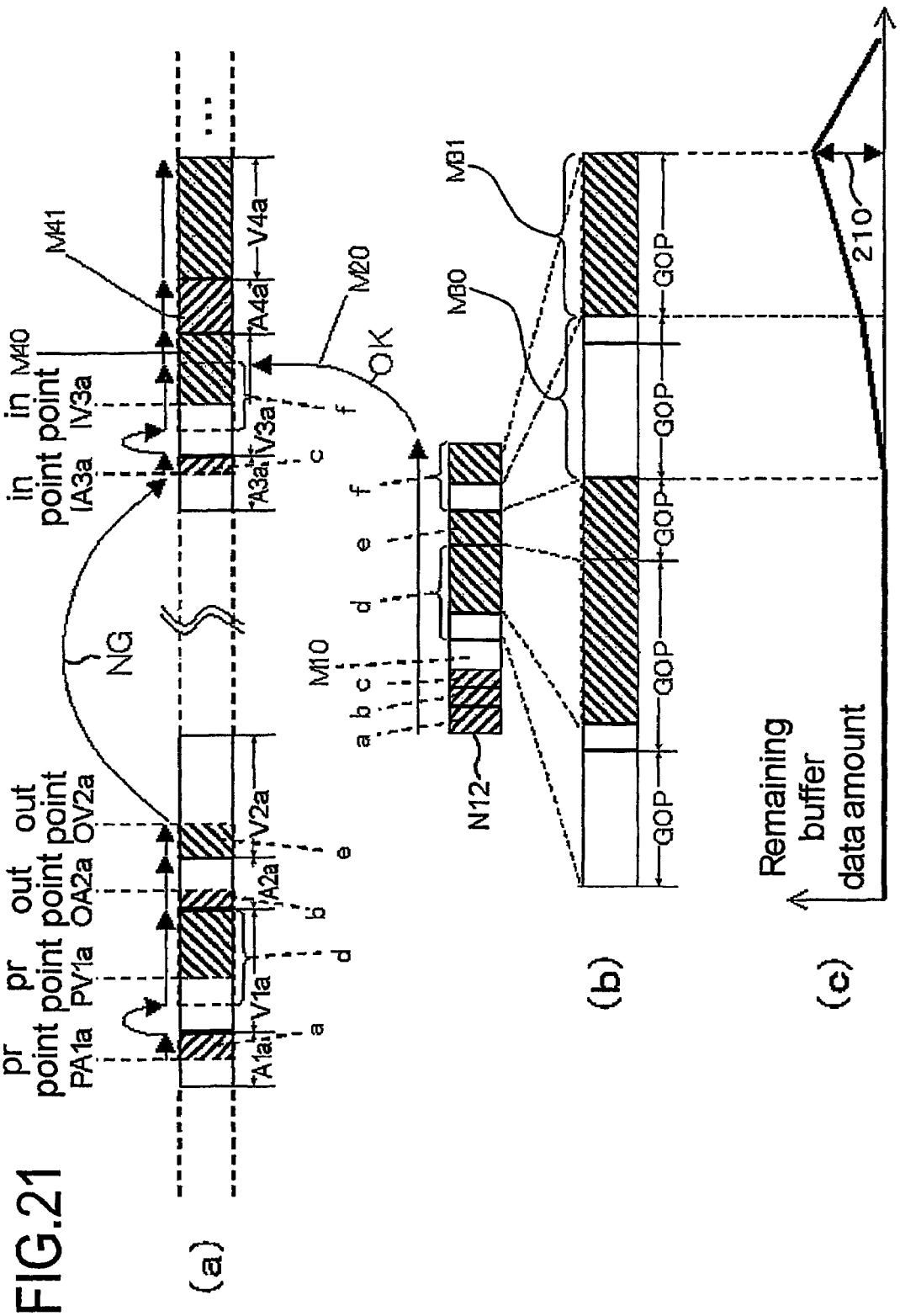

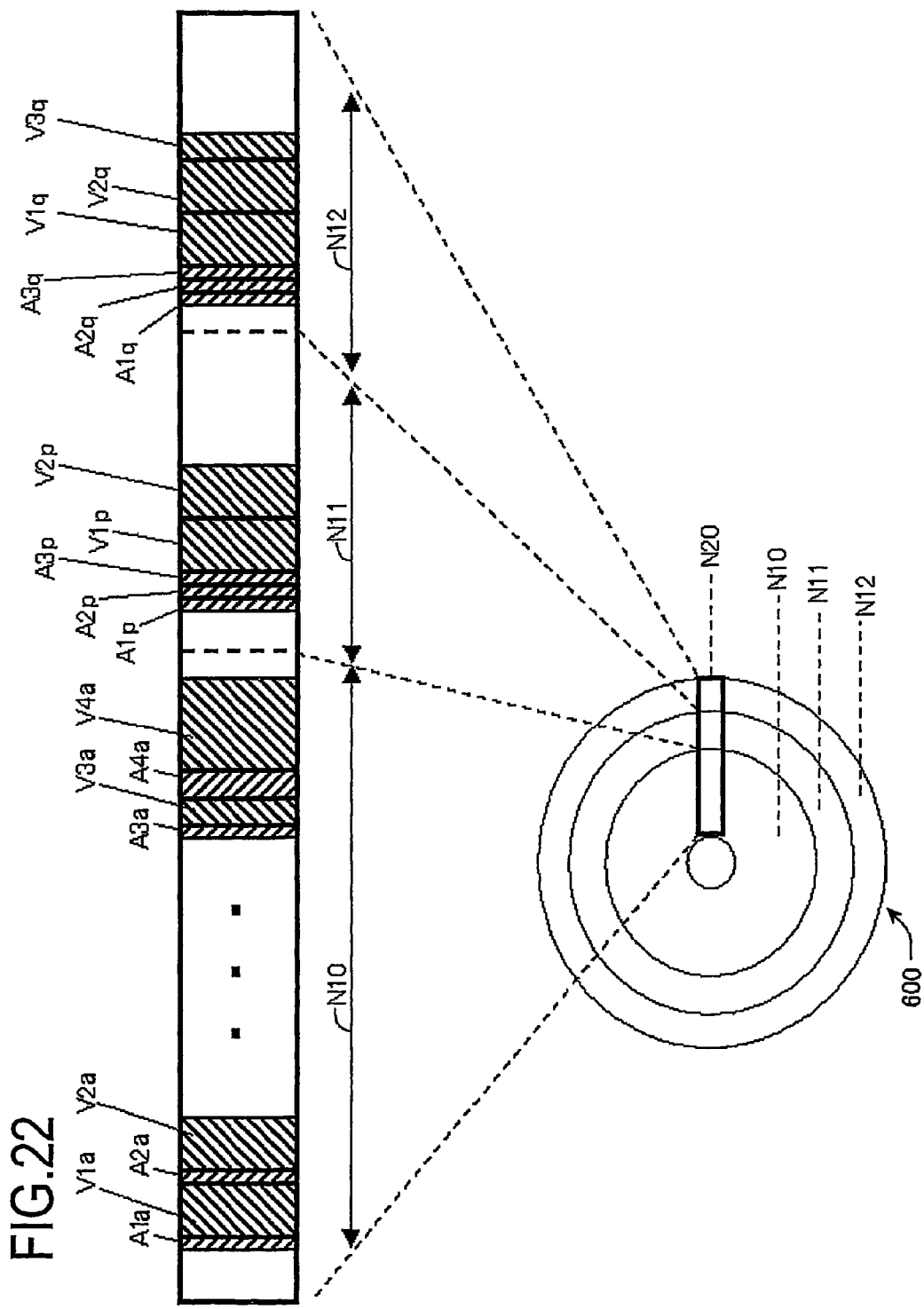

RECORDING AND REPRODUCTION APPARATUS, RECORDING APPARATUS, EDITING APPARATUS, INFORMATION RECORDING MEDIUM, RECORDING AND REPRODUCTION METHOD, RECORDING METHOD, AND EDITING METHOD

TECHNICAL FIELD

The present invention relates to a recording and reproduction apparatus, a recording apparatus, an editing apparatus, an information recording medium, a recording and reproduction method, a recording method, and an editing method for seamlessly reproducing a plurality of pieces of real time data.

BACKGROUND ART

An exemplary information recording medium having a sector structure is an optical disc. As the recording density and the capacity of optical discs have improved recently, real time data including audio data and/or video data is recorded and edited for an increasing range of uses.

Conventional simultaneous reproduction of audio data and video data which is performed using cut-editing will be described.

First, with reference to FIG. 16, a reproduction apparatus 660 for simultaneously reproducing two pieces of real time data will be described. The reproduction apparatus 660 shown in FIG. 16 includes a pickup 654 for recording data to or reproducing real time data from an information recording medium (optical disc) 655, a reproduction buffer A 650 for accumulating real time data 656 which is read from the information recording medium 655, a decoder A 651 for decoding the real time data 656 accumulated in the reproduction buffer A 650, a reproduction buffer B 652 for accumulating real time data 657 which his read from the information recording medium 655, and a decoder B 653 for decoding the real time data 657 accumulated in the reproduction buffer B 652.

In simultaneous reproduction, when data from an information recording medium is read, the data is accumulated in the reproduction buffer. Unless the reproduction buffer becomes empty while the seek operation of the pickup, reproduction of the real time data is not interrupted. In the reproduction apparatus 660 shown in FIG. 16, "Vt" represents the data transfer rate between the pickup 654 and the reproduction buffer A 650 and between the pickup 654 and the reproduction buffer B 652. "Vd" represents the data transfer rate between the reproduction buffer A 650 and the decoder A 651 and between the reproduction buffer B 652 and the decoder B 653. (The data transfer rate between the reproduction buffer A 650 and the decoder A 651 may be represented by "Vd1", and the data transfer rate between the reproduction buffer B 652 and the decoder B 653 may be represented by "Vd2").

FIG. 17 shows an exemplary method of cut-editing which is performed on a continuous recorded area by a unit including a plurality of pieces of audio data and a plurality of pieces of video data. According to cut-editing, read start points (referred to as "in" point) and read finish points ("out" points) are sequentially set in real time data which has been recorded on an information recording medium such that a plurality of recorded areas of the data can be sequentially reproduced. In this example, recorded areas of audio data and video data are not determined based on full-seek time but based on short-distance access conditions such as, for example, fine-seek time. In the case where an access operation from the innermost portion to the outermost portion is necessary in the cut-editing, a full-seek operation is made possible after the plurality of recorded areas of the data are reproduced.

In FIG. 17, recorded areas G10, G12 and G14 in which video data is recorded, and recorded areas G11, G13 and G15 in which audio data is recorded, are located alternately from an inner portion to an outer portion of the information recording medium. Although not shown, a plurality of recorded areas may be present between recorded area G13 and recorded area G14. As shown in FIG. 17, "in" points IG10 and IG11 are set for the data recorded in the recorded areas G10 and G11, respectively. Also shown in FIG. 17, "out" points OG14 and OG15 are set for the data recorded in the recorded areas G14 and G15, respectively. The recorded area G16 is a part of the recorded area G10, and the recorded area G17 is a part of the recorded area G11. The recorded area G18 is a part of the recorded area G14, and the recorded area G19 is a part of the recorded area G15. The recorded area G16 is an area in the recorded area G10 from the position at which the "in" point IG10 is set to the end of the recorded area G10. The recorded area G17 is an area in the recorded area G11 from the position at which the "in" point IG11 is set to the end of the recorded area G11. The recorded area G18 is an area in the recorded area G14 from the beginning of the recorded area G14 to the position at which the "out" point OG14 is set. The recorded area G19 is an area in the recorded area G15 from the beginning of the recorded area G15 to the position at which the "out" point OG15 is set.

With reference to part (a) of FIG. 17, the conditions, for allowing the audio data and the video data to be simultaneously reproduced even when seek operations (part (b) of FIG. 17) are performed after the data recorded from recorded areas G16, G17, G12, G13 to the recorded areas G18 and G19 is reproduced, will be described.

Part (b) of FIG. 17 schematically shows the seek operations of the pickup. An access time includes a read time R31 of the recorded area G16, a seek time Tf1, a read time R32 of the recorded area G17, a seek time Tfi, a read time RV of the recorded area G12, a seek time Tfj, a read time RA of the recorded area G13, a seek time Tf2, a read time R33 of the recorded area G18, a seek time Tf3, a read time R34 of the recorded area G19, and a seek time Ta. It is assumed that a plurality of recorded areas are present between the recorded area G13 and the recorded area G18. Thus, it is assumed that total read time of the recorded areas G12 and G13 and the plurality of recorded areas is equal to the time required for reading the recorded areas G12 and G13 P times. A seek time from the recorded area of the video data to the recorded area of the audio data is represented by Tfj, and a seek time from the recorded area of the audio data to the recorded area of the video data is represented by Tfi. The seek time Tf; and the seek time Tfi, which correspond to the positions of the recorded areas which are present between the recorded area G13 and the recorded area G18, are represented by letters i and J.

Net read times from the information recording medium corresponding to the read times R31, R32, RV, RA, R33, and R34 are TinV, TinAa, TcV, AcAa, ToutV, and ToutAa, respectively.

The conditions regarding the video data are represented by the following expressions.

$$YV \div VdV \geqq (TinV + Tf1 + TinAa + P \times (TcV + Tfj + Tfi + TcAa) + Tf2 + ToutV + Tf3 + ToutAa) + Ta + (P+2) \times (a+b) \times Ts)$$

$$YV = (TinV + P \times TcV + ToutV) \times Vt$$

The conditions regarding the audio data are represented by the following expressions.

$$YA \div VdA \geq (TinV+Tf1+TinAa+P\times(TcV+Tfj+Tfi+TcAa)+Tf2+ToutV+Tf3+ToutAa)+Ta+(P+2)\times(a+b)\times Ts)$$

$$YA=(TinAa+P\times TcAa+ToutAa)\times Vt$$

The conditions for the simultaneous reproduction of the video data and the audio data are represented by the following expressions.

$$YV \div VdV \geq (Tf1+Tf2+Tf3+P\times(Tfj+Tfi)+Ta+(P+2)\times(a+b)\times Ts)\times Vt \div (Vt-VdV-VdA)$$

$$YA \div VdA \geq (Tf1+Tf2+Tf3+P\times(Tfj+Tfi)+Ta+(P+2)\times(a+b)\times Ts)\times Vt \div (Vt-VdV-VdA)$$

Since the time for reproducing the data of YA is equal to the time for reproducing the data of YV, $$YA \div VdA = YV \div VdV.$$

Since the time for reproducing the data of YcV is equal to the time for reproducing the data of YcA, $$YcV \div VdV = YcA \div YdA,$$

$$YcV = TcV \times Vt, \text{ and}$$

$$YcA = TcAa \times Vt.$$

In the above expressions, the letters represent the following.

P: Number of recorded areas which are completely continuously read in a cut-edited area ($P \geq 0$);
YV: Total size of the video data to be reproduced;
YA: Total size of the audio data to be reproduced;
VdV: Data rate of the video data;
VdA: Data rate of the audio data;
Tf1: Seek time from the recorded area G16 to the recorded area G17;
Tf2: Seek time from the recorded area G13 to the recorded area G18;
Tf3: Seek time from the recorded area G18 to the recorded area G19;
Ta: Seek time from the recorded area G19 to the next recorded area;
a: Number of ECC blocks skipped in each of the recorded areas G16, G12 and G18 of the video data;
b: Number of ECC blocks skipped in each of the recorded areas G17, G13 and G19 of the audio data;
Ts: Time required for recording one ECC block;
Vt: Rate at which data is read from the information recording medium;
YcV: Size of the video data in the recorded area G12; and
YcA: Size of the audio data in the recorded area G13.

From the conditions for the simultaneous reproduction, the value of P is obtained. In consideration of the obtained value of P and the short-distance access time, the minimum size of the recorded area of each of the audio data and the video data is determined. Seamless reproduction is performed by recording the audio data and the video data in an interleaving manner such that the number of the recorded areas is smaller than the obtained value of P.

In the example of FIG. 17, the audio data and the video data are recorded discretely. In the case where the audio data and the video data are recorded in continuous areas, the seek operation between the audio data and the video data is not necessary. As a result, the conditions for seamless reproduction are alleviated (see, for example, Japanese Application No. 2002-252097 (FIGS. 17 and 20).

The above-described conventional art does not consider the delay time generated by the decoding operation of the compressed video data and audio data, or the variable bit rate. Therefore, there is a problem in that although the determination result that seamless reproduction of edited real time data is possible is obtained, actual reproduction does not result in seamless reproduction since the video data or audio data is interrupted.

DISCLOSURE OF THE INVENTION

According to one aspect of the invention, a recording and reproduction apparatus includes a reading section for reading first data and second data from an information recording medium; a first buffer section for temporarily accumulating the read first data; a second buffer section for temporarily accumulating the read second data; a first decoding section for outputting first decoded data generated by decoding the accumulated first data, a second decoding section for outputting second decoded data generated by decoding the accumulated second data; a first setting section for setting a read finish point of the first data; a second setting section for setting a read start point of the second data; and a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

In one embodiment of the invention, the calculated first time period includes a time period which is obtained by subtracting a time period, required for reading data from a read start point of the first data to the read finish point of the first data, from a time period obtained by dividing a data amount from the read start point of the first data to the read finish point of the first data by a bit rate corresponding to the first data.

In one embodiment of the invention, the first data includes a plurality of data portions between a read start point of the first data and the read finish point of the first data. The plurality of data portions are each associated with a bit rate. The calculated first time period includes a time period which is obtained by subtracting a time period, required for reading data from the read start point of the first data to the read finish point of the first data, from a time period which represents a sum of a plurality of time periods, the plurality of time periods being obtained by dividing a data amount of each of the plurality of data portions by a bit rate corresponding to each of the plurality of data portions.

In one embodiment of the invention the bit rate associated with an m'th data portion among the plurality of data portions is different from the bit rate associated with an n'th data portion among the plurality of data portions, where m is an integer and n is an integer different from m.

In one embodiment of the invention, the first data includes a plurality of data portions between a read start point of the first data to the read finish point of the first data. The calculated first time period includes a time period from when one of the plurality of data portions is input to the first decoding section until the first decoding section outputs decoded data which is generated by decoding the one of the plurality of data portions.

In one embodiment of the invention, the first buffer section includes a track buffer section and a VBV buffer section. The calculated first time period includes a time period in which one of the plurality of data portions is accumulated in the VBV buffer section.

In one embodiment of the invention, the first data includes a plurality of data portions from a read start point of the first data to the read finish point of the first data. Each of the plurality data portions is associated with a bit rate. The first buffer section includes a track buffer section and a VBV buffer section. The calculated first time period is TA, TA is expressed by TA=Σ(V(i)/VdV(i))−Σ(TR(i)+a(i)×Ts)+TdlyA where:

V(i) is a data amount of an i'th data portion among the plurality of data portions where i is an integer, VdV(i) is a bit rate associated with the i'th data portion, TR (i) is a time period required for reading the i'th data portion, a(i) is a number of defective ECC blocks present in an area in the information recording medium where the i'th data portion is recorded, Ts is a time period required for skipping one ECC block, and TdlyA is a time period representing a sum of a time period, in which one of the plurality of data portions is accumulated in the VBV buffer section, and a time period from when the one of the plurality of data portions is input to the first decoding section until the first decoding section outputs decoded data which is generated by decoding the one of the plurality of data portions.

In one embodiment of the invention, the calculated second time period includes a time period required for a seek operation of the reading section from the read finish point to the read start point, and a time period from when at least a portion of the second data is input to the second decoding section until the second decoding section outputs decoded data which is generated by decoding the at least a portion of the second data.

In one embodiment of the invention, the calculated second time period includes a time period in which the at least a portion of the second data is accumulated in the second buffer section.

In one embodiment of the invention, the calculated second time period includes a time period required for a seek operation of the reading section from the read finish point to the read start point, and a time period from when at least a portion of the second data is input to the second decoding section until the second decoding section outputs decoded data which is generated by decoding the at least a portion of the second data.

In one embodiment of the invention, the calculated second time period includes a time period in which the at least a portion of the second data is accumulated in the second buffer section.

In one embodiment of the invention, the calculated second time period includes a time period required for a seek operation of the reading section from the read finish point to the read start point, and a time period required for pre-decoding processing for obtaining prescribed data which is used for decoding data corresponding to the read start point of the second data.

In one embodiment of the invention, where the calculated second time period is TB, TB is expressed by TB=Tf+Tb+TdlyB+Tin where:

Tf is a time period required for a seek operation of the reading section from the read finish point to the read start point, Tb is a time period required for reading data which is readable during a period from the start point of the seek operation until data corresponding to the read start point is read, TdlyB is a time period representing a sum of a time period, in which at least a portion of the second data is accumulated in the second buffer section, and a time period from when the at least a portion of the second data is input to the second decoding section until the second decoding section outputs decoded data which is generated by decoding the at least a portion of the second data, and Tin is a time period required for pre-decoding processing for obtaining prescribed data which is used for decoding data corresponding to the read start point of the second data.

In one embodiment of the invention, where the calculated second time period is TB, TB is expressed by TB=Tf+Tb+TdlyB+Tin, where:

Tf is a time period required for a seek operation of the reading section from the read finish point to the read start point, Tb is a time period required for reading data which is readable during a period from the start point of the seek operation until the data corresponding to the read start point is read, TdlyB is a time period representing a sum of a time period, in which at least a portion of the second data is accumulated in the second buffer section, and a time period from when the at least a portion of the second data is input to the second decoding section until the second decoding section outputs decoded data which is generated by decoding the at least a portion of the second data, and Tin is a time period required for pre-decoding processing for obtaining prescribed data which is used for decoding data corresponding to the read start point of the second data.

In one embodiment of the invention, the recording and reproduction apparatus further includes a writing section for writing, in the information recording medium, at least one of, at least a portion of the first data and at least a portion of the second data. When determining that the length of the calculated first time period is shorter than the length of the calculated second time period, the control section controls the writing section so as to change a recording position, in the information recording medium, of at least one of, at least a portion of the first data and at least a portion of the second data, such that the length of the first time period is greater than or equal to the length of the second time period.

In one embodiment of the invention, the control section controls the writing section so as to change the recording position of one of the at least a portion of the first data and the at least a portion of the second data, which has a smaller data amount.

In one embodiment of the invention, the first data includes first audio data and first video data; the second data includes second audio data and second video data; and the control section controls the writing section such that the first audio data and the second audio data are recorded on the information recording medium adjacently to each other, and such that the first video data and the second video data are recorded on the information recording medium adjacently to each other.

In one embodiment of the invention, the information recording medium is an optical medium.

In one embodiment of the invention, the information recording medium is a semiconductor memory medium.

According to another aspect of the invention, a recording apparatus for recording on an information recording medium at least one of first data and second data to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The recording apparatus includes a first setting section for setting a read finish point of the first data; a second setting section for setting a read start point of the second data; and a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

In one embodiment of the invention the recording apparatus further includes a writing section for writing, in the information recording medium, at least one of, at least a portion of the first data and at least a portion of the second data, wherein the control section controls the writing section so as to write in the information recording medium at least one of, at least a portion of the first data and at least a portion of the second data, such the length of the first time period is greater than or equal to the length of the second time period.

In one embodiment of the invention, the first data includes first audio data and first video data; the second data includes second audio data and second video data; and the control section controls the writing section such that the first audio data and the second audio data are recorded on the information recording medium adjacently to each other, and such that the first video data and the second video data are recorded on the information recording medium adjacently to each other.

According to still another aspect of the invention, an editing apparatus for editing at least one of first data and second data recorded on an information recording medium to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The editing apparatus includes a first setting section for setting a read finish point of the first data; a second setting section for setting a read start point of the second data; and a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

According to still another aspect of the invention, an information recording medium having first data and second data recorded thereon to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. A read finish point is set for the first data. A read start point is set for the second data. The first data and the second data are arranged such that a length of the first time period, from a start point of a seek operation of the reading section from the read finish point to the read start point until the first decoding section completes output of the first decoded data, is greater than or equal to a length of second time period, from the start point of the seek operation until the second decoded data is allowed to be output by the second decoding section.

According to still another aspect of the invention, a recording and reproduction method includes the steps of reading first data and second data from an information recording medium; temporarily accumulating the read first data; temporarily accumulating the read second data; outputting first decoded data generated by decoding the accumulated first data; outputting second decoded data generated by decoding the accumulated second data; setting a read finish point of the first data; setting a read start point of the second data; and calculating a first time period, from a start point of a seek operation from the read finish point to the read start point until output of the first decoded data is completed, and a second time period, from the start point of the seek operation until the second decoded data is allowed to be output; and comparing a length of the calculated first time period and a length of the calculated second time period.

According to still another aspect of the invention, a recording method for recording on an information recording medium at least one of first data and second data to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The recording method includes the steps of setting a read finish point of the first data; setting a read start point of the second data; and calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

In one embodiment of the invention, the recording method further includes the step of writing, in the information recording medium, at least one of, at least a portion of the first data and at least a portion of the second data, such that the length of the first time period is greater than or equal to the length of the second time period.

In one embodiment of the invention, the first data includes first audio data and first video data; the second data includes second audio data and second video data. The step of writing includes the step of recording at least one of the first audio data and the second audio data on the information recording medium such that the first audio data and the second audio data are adjacent to each other, and recording at least one of the first video data and the second video data on the information recording medium such that the first video data and the second video data are adjacent to each other.

According to still another aspect of the invention, an editing method for editing at least one of first data and second data recorded on an information recording medium to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The editing method includes the steps of setting a read finish point of the first data; setting a read start point of the second data; and calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

According to the present invention, (i) a first time period, from a start point of a seek operation of a reading section from a read finish point to a read start point until a first decoding section completes output of first decoded data, (ii) and a second time period, from the start point of the seek operation until second decoded data is allowed to be output by the second decoding section, are calculated; and a length of the calculated first time period and a length of the calculated second time period are compared with each other. Based on the comparison result, it is determined whether or not seamless reproduction is possible. According to the present invention, the condition for seamless reproduction is determined in consideration of the delay time generated by the decoding processing of compressed video data, the variable bit rate, or the like. Therefore, whether or not seamless reproduction is possible can be determined accurately.

Thus, the invention described herein makes possible the advantages of providing correct determination on whether seamless reproduction is possible or not by determining seamless reproduction conditions in consideration of, for example, the delay time which is generated by the decoding processing and the variable bit rate.

These and other advantages of the present invention will become apparent to those skilled in the art upon reading and understanding the following detailed description with reference to the accompanying figures.

BRIEF DESCRIPTION OF THE DRAWINGS

FIG. 10 shows a GOP data structure in the decoding model according to the present invention;

FIG. 14 is a flowchart illustrating cut-editing according to the present invention;

FIG. 21 shows second rearrangement processing according to the present invention; and FIG. 22 shows a recording state of an information recording medium according to the present invention.

BEST MODE FOR CARRYING OUT THE INVENTION

Hereinafter, the present invention will be described by way of illustrative examples with reference to the accompanying drawings.

Example 1

First, conditions for cut-editing of real time data including video data compressed using a compression system will be described. The compression system is MPEG in this example, but is not limited to this.

Figure 6:
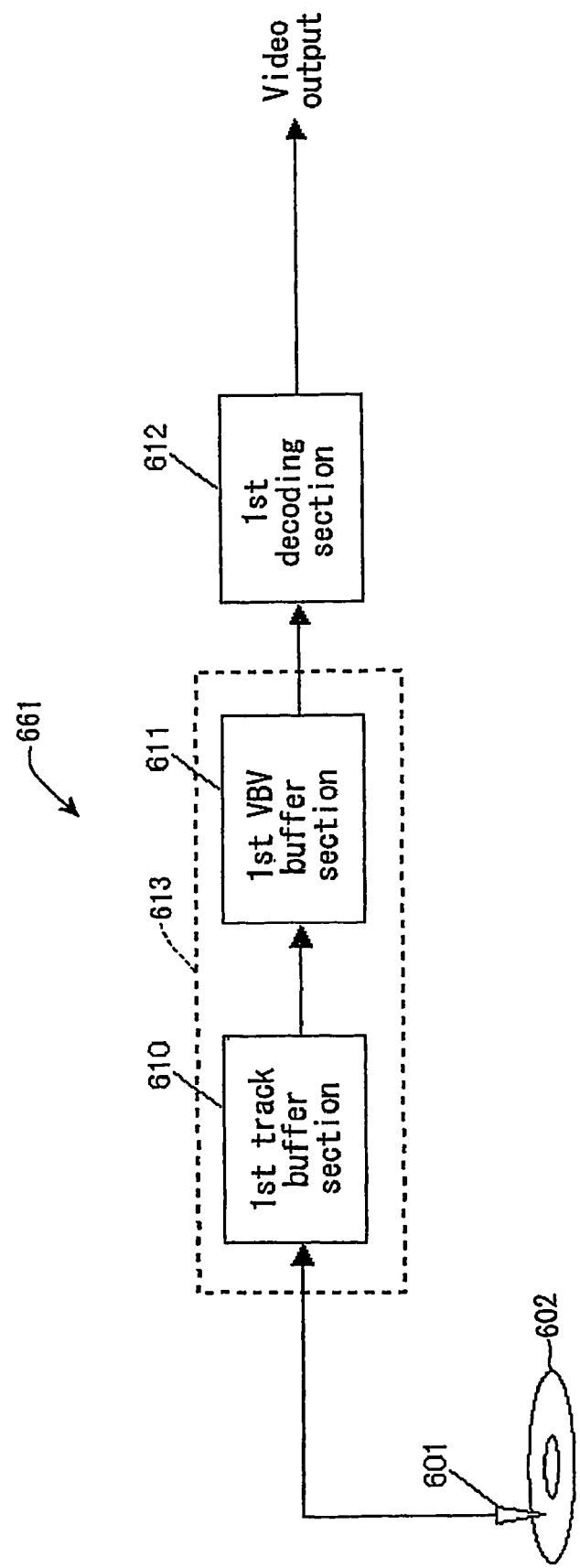
FIG. 6 shows a single decoder reproduction apparatus.

FIG. 6 shows a single decoder reproduction apparatus 661. In the case where data recorded on an information recording medium 602 is edited by, for example, cut-editing, it is necessary to decode two discontinuous pieces of MPEG data in order to output frame data seamlessly. Such processing is very difficult with the single decoder reproduction apparatus 661 having one decoding section. Thus, a multiple decoder reproduction apparatus 662 shown in FIG. 7 having a plurality of decoding sections is necessary.

Figure 7:
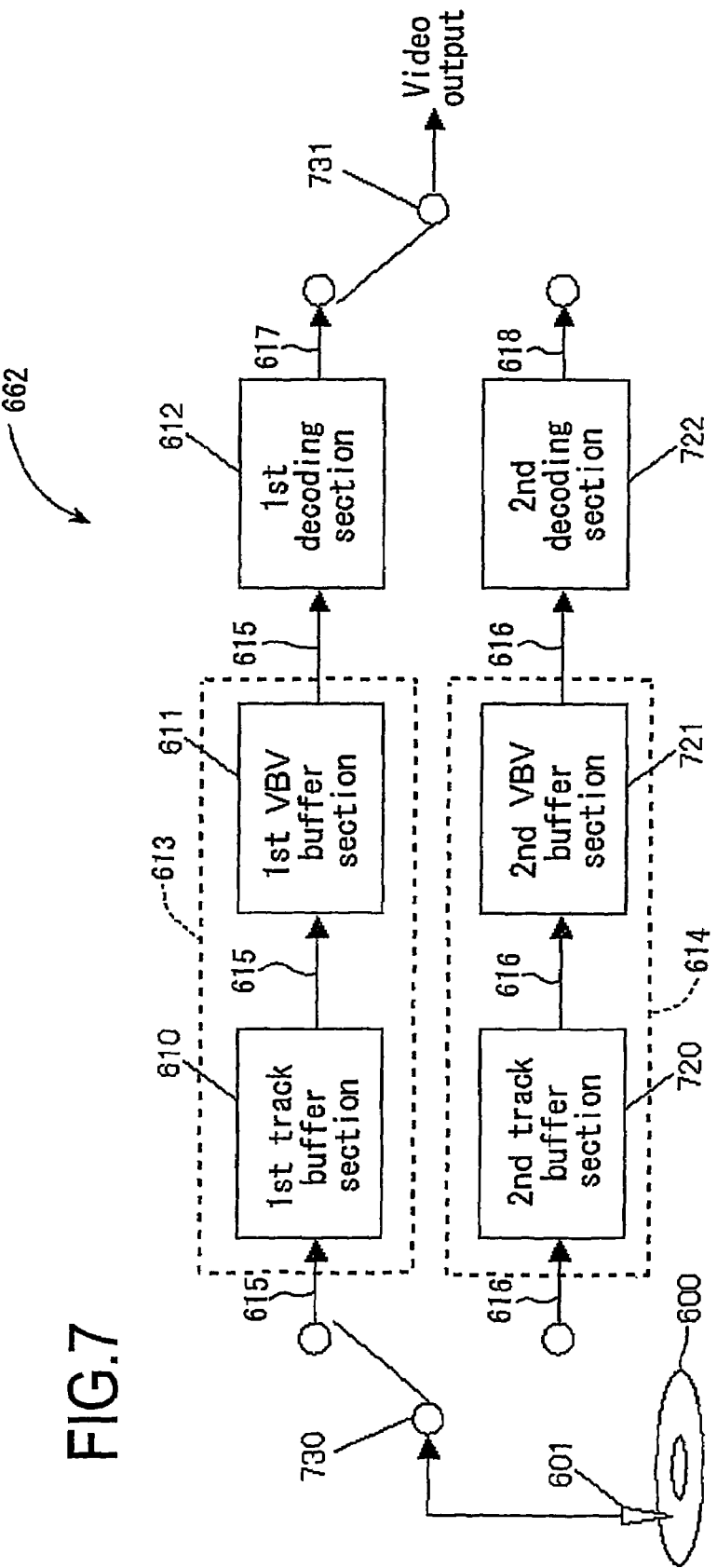
FIG. 7 shows a multiple decoder reproduction apparatus according to the present invention.

FIG. 7 shows the multiple decoder reproduction apparatus 662 according to the present invention.

It is assumed that an "in" point (a read start point at which data read is started) and an "out" point (a read finish point at which data read is finished) are each set at a designated position in a GOP. "GOP" is an acronym for Group of Pictures, and means a data group of a plurality of picture frames. Picture frames are available in three types of I frame, P frame and B frame. GOP and picture frame are defined in the MPEG Standards. These definitions are well known and are not described herein. In order to seamlessly reproduce data between the "in" point set at the designated position in a GOP and an "out" point set at the designated position in another GOP, two decoding sections are required.

The multiple decoder apparatus 662 includes a pickup 601, a first buffer section 613, a second buffer section 614, a first decoding section 612, a second decoding section 722, a read data switching section 730, and a decoding section output switching section 731.

The information recording medium 600 is, for example, an optical disc medium. The information recording medium 600 has first real time data 615 and second real time data 616 recorded thereon. The pickup 601 is a reading section for reading the first real time data 615 and the second real time data 616 from the information recording medium 600. The first buffer section 613 temporarily accumulates the first real time data 615 read by the pickup 601. The second buffer section 614 temporarily accumulates the second real time data 616 read by the pickup 601. The first decoding section 612 outputs first decoded data 617 which is generated by decoding the accumulated first real time data 615. The second decoding section 722 outputs second decoded data 618 which is generated by decoding the accumulated second real time data 616.

The first buffer section 613 includes a first track buffer section 610 and a first VBV buffer section 611. The second buffer section 614 includes a second track buffer section 720 and a second VBV buffer section 721. The first track buffer section 610 and the second track buffer section 720 are provided in the multiple decoder reproduction apparatus 662 in order to realize continuous data transfer even during the seek operation of the pickup 601 (i.e., in the state where no data is read). The first VBV buffer section 611 and the second VBV buffer section 721 are provided in the multiple decoder reproduction apparatus 622 in order to prevent data under flow during the decoding processing performed by the first decoding section 612 and the second decoding section 722.

Thus, the data reproduced from the information recording medium 600 is processed by two independent reproduction systems. By switching the output of the decoded data at a prescribed timing by the decoding section output switching section 731, two pieces of real time data can be reproduced continuously.

Figure 2:
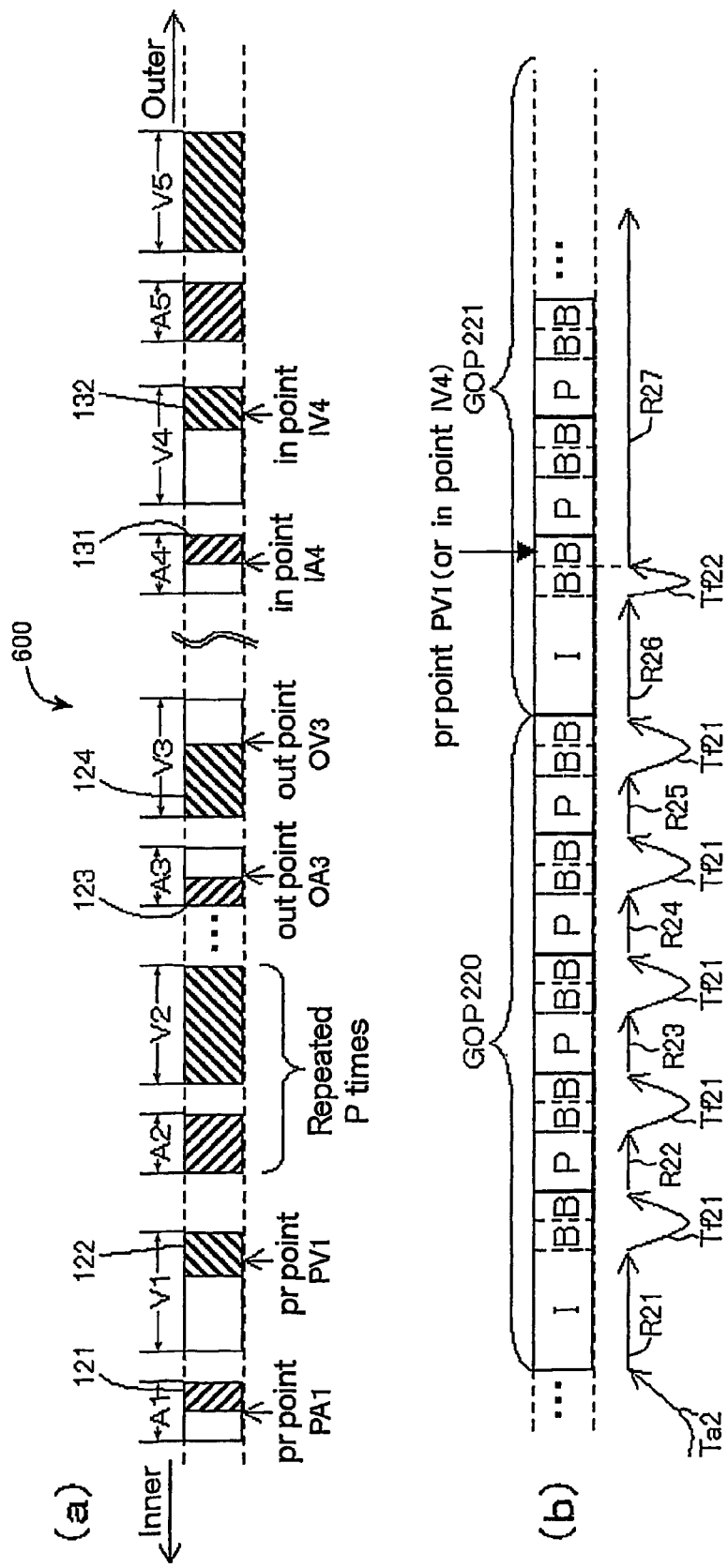
FIG. 2 shows an arrangement of real time data and an example of how to set an "out" point and an "in" point according to the present invention.

FIG. 2 shows an exemplary manner of arranging two pieces of real time data, and an exemplary manner of setting the "out" point and the "in" point for the cut-editing in this example. Part (a) of FIG. 2 shows recorded areas of the information recording medium 600 (FIG. 7). The left side in part (a) of FIG. 2 represents the inner side, and the right side in part (a) of FIG. 2 represents the outer side. In the information recording medium 600, recorded areas A1, A2, A3, A4 and A5 of audio data, and recorded areas V1, V2, V3, V4 and V5 of video data, are alternately arranged. The recorded areas A2 and V2 may be repeated P times. A plurality of recorded areas may be present between the recorded area V2 and the recorded area A3.

As shown in part (a) of FIG. 2, "pr" points (pre-roll points, i.e., the read start points at which data read is started) of the video data and the audio data are set for the data recorded in the recorded areas A1 and V1, respectively. The "out" points of the video data and the audio data are set for the data recorded in the recorded areas A3 and V3, respectively. The "in" points of the video data and the audio data are set for the data recorded in the recorded areas A4 and V4, respectively. The "pr" points, "out" points, and "in" points are each represented by an address number of the position of the data for which the point is set. Information representing each of the address numbers is recorded on the information recording medium 600 (each of the "pr" points, "out" points, and "in" points also represents a position in the recorded area). The audio data and the video data from a "pr" point to an "out" point are reproduced, and then the audio data and the video data starting from an "in" point are reproduced.

Part (a) of FIG. 2 shows areas necessary for data reproduction with hatching. The hatched areas are a recorded area 121, a recorded area 122, the entire recorded area A2, the entire recorded area V2, a recorded area 123, a recorded area 124, a recorded area 131, a recorded area 132, the entire recorded area A5, and the entire recorded area V5. Data in these hatched areas is reproduced after the cut-editing. The recorded area 121 is from the position in the recorded area A1 at which "pr" point PA1 is set to the end of the recorded area A1. The recorded area 122 is from a position in the recorded area V1 slightly before the position at which "pr" point PV1 is set to the end of the recorded area V1. The recorded area 123 is from the beginning of the recorded area A3 to a position in the recorded area A3 at which "out" point OA3 is set. The recorded area 124 is from the beginning of the recorded area V3 to a position in the recorded area V3 at which "out" point OV3 is set. The recorded area 131 is from the position in the recorded area A4 at which "in" point IA4 is set to the end of the recorded area A4. The recorded area 132 is from a position in the recorded area V4 slightly before the position at which "in" point IV4 is set to the end of the recorded area V4.

Part (b) of FIG. 2 is an enlarged view of the "pr" point PV1 in the recorded area V1 (or the "in" point IV4 in the recorded area V4) and the vicinity thereof. In part (b) of FIG. 2, letters I, P, and B respectively represent I frame, P frame, and B frame.

In the case where a "pr" point or an "in" point is set in a specific frame, the data of the specified frame may not be sufficient to perform the decoding processing in MPEG. In that case, it is necessary to decode data of another frame(s) which is required to decode the data in the specified frame. For example, in part (b) of FIG. 2, the frame in which the "pr" point or the "in" point for the video data is set is the third frame in a GOP 221 (B frame). In order to decode this B frame, it is necessary to decode beforehand the first frame in the GOP 221 (I frame) and also all the I frames and the P frames in a GOP 220 which is immediately previous to the GOP 221. Therefore, regarding the "in" point IV4 in the recorded area V4 or the like, it is necessary to read data from the beginning of the GOP 220 (immediately previous to the GOP 221) and obtain the information in the necessary I frames and P frames, precisely as shown in part (b) of FIG. 2. For this, read times R21, R22, R23, R24, R25, R26 need to be spent. Since the B frames in the GOP 220 do not need to be reproduced, this portion is skipped using a seek operation such as, for example, a fine-seek operation. Or, when the data size of the B frames is small, the information recording medium is allowed to rotate without the data being read and with no seek operation being performed. In this way, a desired frame can be accessed. Reference numeral "Tf21" represents this time period, which varies in accordance with the amount of data of the unnecessary B frames. Since the second frame in the GOP 221 (B frame) does not need to be read, similar processing is performed. This time period corresponding to Tf21 is represented by reference numeral "Tf22". After this, data after the designated "pr" point PV1 (or the "in" point IV4) is reproduced over a read time R27.

In the case where the "in" point is set in the fourth frame in the GOP 221 (P frame) or thereafter, it is not necessary to read the data in the GOP 220. The read data can be decoded using the data in the I frames or the P frames in the GOP 221.

Figure 1:
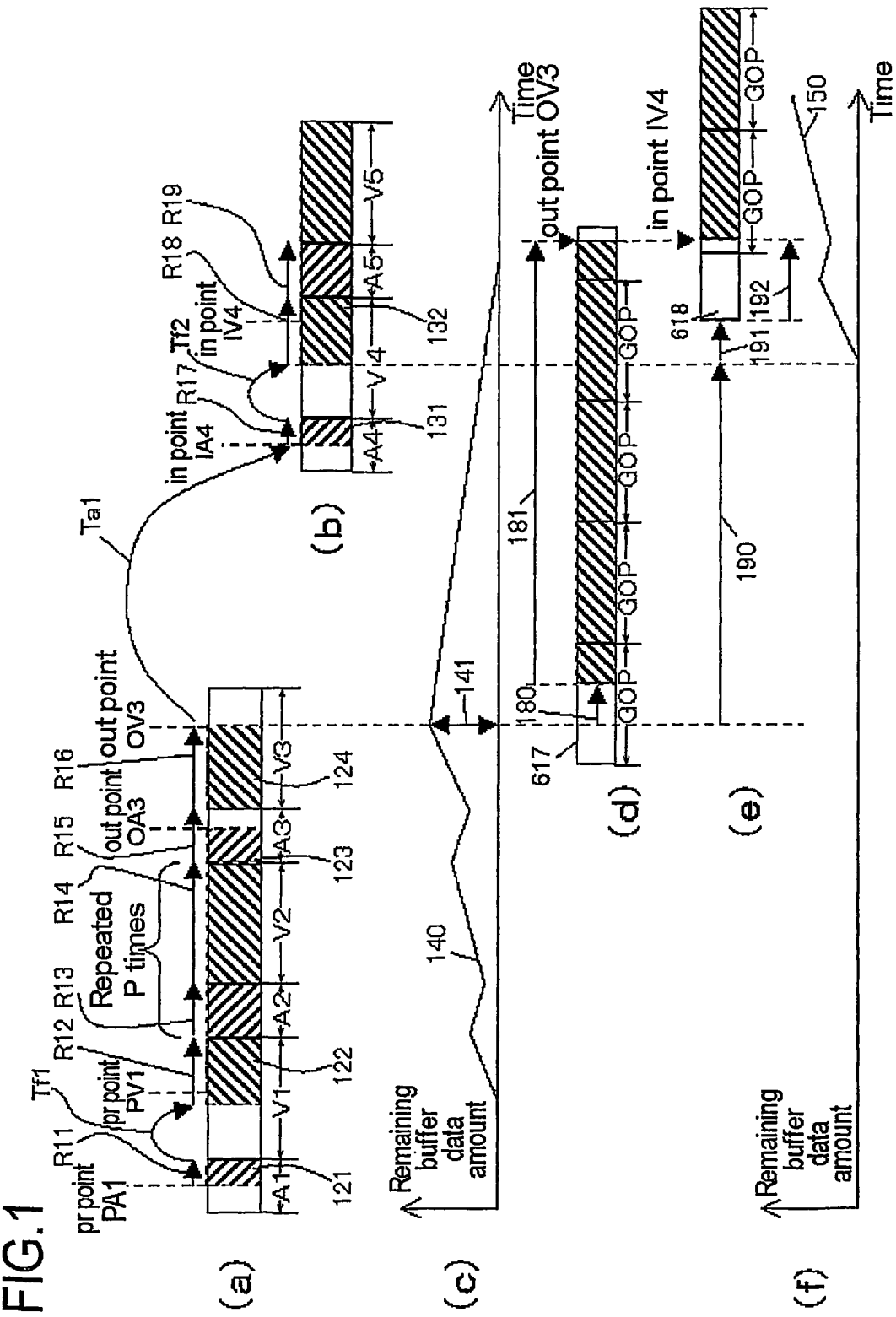
FIG. 1 shows a cut-editing condition according to the present invention.

With reference to FIG. 1, a cut-editing condition according to the present invention for continuously reproducing data which is designated by the editing such as, for example, cut-editing, without the video or the audio being interrupted will be described. In FIG. 1, the recorded areas A1 through A5 and V1 through V5 are the same as those described above with reference to FIG. 2.

Part (a) of FIG. 1 shows an access operation in the recorded areas in which the first real time data 615 is recorded. Part (b) of FIG. 1 shows an access operation in the recorded areas in which the second real time data 616 is recorded. The first real time data 615 is recorded discretely in the recorded area A1 through A3 and the recorded areas V1 through V3. The second real time data 616 is recorded discretely in the recorded areas A4 and A5 and the recorded areas V4 and V5. Reference numerals R11 through R19 each represent a read time, and reference numerals Tf1 and Tf2 each represent a seek time.

In part (c) of FIG. 1, the vertical axis represents the remaining buffer data amount in the first track buffer section 610, and the horizontal axis represents the time. Reference numeral 140 represents a change of the remaining buffer data amount in accordance with time. Similarly, in part (f) of FIG. 1, the vertical axis represents the remaining buffer data amount in the second track buffer section 720, and the horizontal axis represents the time. Reference numeral 150 represents a change of the remaining buffer data amount in accordance with time. Part (d) of FIG. 1 shows the first decoded data 617 which is output by the first decoding section 612 in accordance with time (horizontal axis of part (c)). Part (e) of FIG. 1 shows the second decoded data 618 which is output by the second decoding section 722 in accordance with time (horizontal axis of part (f)).

A series of access operations are performed as follows. First, reproduction is started from the "pr" point PA1 in the recorded area A1 (part (a) of FIG. 1), and data in the recorded area 121 from the "pr" point PA1 (in the recorded area A1) to the end of the recorded area A1 is reproduced. Next, data in the recorded area 122 from the position slightly before the "pr" point PV1 (in the recorded area V1) to the end of the recorded area V1 is reproduced. Then, data in the recorded area A2 and the recorded area V2 is reproduced. Considering the case where a plurality of continuous recorded areas (such as the recorded area A2 and the recorded area V2) are present, a reproduction operation of the pair of recorded areas, i.e., the recorded area A2 and the recorded area V2, is repeated P times. Then, data in the recorded area 123 from the beginning of the recorded area A3 to the "out" point OA3 (in the recorded area A3) is reproduced, and data in the recorded area 124 from the beginning of the recorded area V3 to the "out" point OV3 (in the recorded area V3) is reproduced. The portion from the end of the recording area 123 to the beginning of the recorded area 124 includes audio data which does not need to be reproduced. The information recording medium may be allowed to rotate without the data in this portion being read and without a fine-seek operation being performed, until the pickup 601 reaches the beginning of the recorded area 124. The reason is that the amount of audio data is generally small. After the data up to the end of the, recorded area 124 is reproduced, a seek operation of the pickup 601 is performed to the "in" point IA4 in the recorded area A4 (part (b) of FIG. 1).

After the seek operation, data in the recorded area 131 from the "in" point IA4 (in the recorded area A4) to the end of the recorded area A4 is reproduced. Next, data in the recorded area 132 from the position slightly before the "in" point IV4 (in the recorded area V4) to the end of the recorded area V4 is reproduced. Then, data in the recorded area A5 and the recorded area V5 is reproduced. The portion from the end of the recording area 131 to the beginning of the recorded area 132 includes video data which does not need to be reproduced. Since the amount of video data is generally large, a fine-seek operation may be performed. The recorded area 132 in the recorded area V4 includes the frame data which is required to be decoded beforehand in order to decode the data of one of the subsequent frames in which the "in" point is set, as described above with reference to part (b) of FIG. 2.

With reference to part (c) of FIG. 1, the remaining buffer data amount 140 is 0 in its initial state. While the video data is reproduced from the beginning of the recorded area 122 (part (a) of FIG. 1) to the recorded areas 122, V2 and 124, the remaining buffer data amount 140 increases owing to the difference between the rate of data read from the information recording medium and the bit rate of each piece of video data. By contrast, during the seek operation or while the audio data is reproduced, the remaining buffer data amount 140 decreases. After the data is reproduced up to the "out" point OV3 in the recorded area V3 (part (a) of FIG. 1), the read data switching section 730 (FIG. 7) switches the destination of data transfer to the second track buffer section 720. Accordingly, as shown in part (c) of FIG. 1, the remaining buffer data amount 140 decreases simultaneously with the start of the seek operation and becomes 0.

With reference to part (f) of FIG. 1, the remaining buffer data amount 150 is 0 in its initial state. While the video data is reproduced in the recorded areas 132 and V5 (part (b) of FIG. 1) after the seek-operation, the remaining buffer data amount 150 increases.

With reference to part (d) of FIG. 1, the first decoded data 617 is output as follows. The frame data starts to be output a prescribed time after the video data in the recorded area 122 (part (a) of FIG. 1) starts to be reproduced. Part (d) of FIG. 1 shows only the frame output after the start of the seek operation, for the sake of simplicity. Reference numeral 141 (part (c) of FIG. 1) represents a remaining data amount in the first track buffer 610 at the start of the seek operation. The data which remains in the first track buffer 610 at the start of the seek operation is output after a prescribed delay time 180 (part (d) of FIG. 1). (The hatched portion in part (d) of FIG. 1 represents data output from the first decoding section 612 corresponding to the data remaining in the first track buffer 610 at the start of the seek operation.) The data accumulated in the first track buffer 610 is sequentially decoded, and decreases in amount. Finally, the first decoding section 612 outputs the data of the frame in which the "out" point OV3 is set. At this point, the decoding section output switching section 731 (FIG. 7) is switched from the data output from the first decoding section 612 to the data output from the second decoding section 722. Slightly before this switching processing is performed, the read data switching section 730 (FIG. 7) has switched the destination of data transfer to the second track buffer section 720, and thus the second decoding section 722 has started the decoding processing via the second VBV buffer section 721. Part (e) of FIG. 1 shows the second decoded data 618 output by the second decoding section 722. The second decoding section 722 outputs the frame in which the "in" point IV4 is set after a seek time 190, a prescribed delay time 191, and a decoding time 192 of I frames and P frames which are required to be decoded in order to decode the data of the frame in which the "in" point IV4 is set. Then, the second decoding section 722 decodes and outputs the frames while decreasing the remaining buffer data amount in part (f) of FIG. 1.

The cut-editing condition according to the present invention is the condition under which the frame, in which an "in" point is set, is prepared to be output before the frame, in which the "out" point is set, is output. Specifically, under these conditions at the start of a seek operation, the recorded areas are located such that the time period in which the first decoding section 612 can output the video data using the real time data remaining in the first track buffer section 610 is longer than the time period in which the frame, in which the "in" point for the second real time data 616 is set, can be output.

Hereinafter, the cut-editing condition will be described. The data mount in the recorded area 122 is V1pr, and the bit rate in the recorded area 122 is VdV1pr. The recorded areas A2 and V2 are considered to be repeated P times for calculation since a plurality of areas similar to these are present. The data amount in the recorded area V2 is V2(i). Letter i represents the number of times of repetition, and i=1 through P. The bit rate in the recorded area V2 is VdV2(i). The data amount in the recorded area V3 is V3out, and the bit rate in recorded area V3 is VdV3out. The time period until all the above data is consumed by the decoding section (i.e., the reproduction time period in the state where all the above data is decoded) is TDEC. TDEC is represented by the following expression.

$$TDEC=V1pr/VdV1pr+\Sigma(V2(i)/VdV2(i))+V3out/VdV3out$$

where $\Sigma$ is i=1 through P.

The time required for reading the data in the recorded area 122 is TprV1+a×Ts. Letter "a" is the number of defective ECC blocks to be skipped in the recorded areas of the video data. Ts is the time period required for skipping one ECC block. Where the time period required for reading one channel of audio data in the recorded area A2 is TcA2, the number of channels of audio data is N, and the number of defective ECC blocks to be skipped in the recorded areas of the audio data is b, the time period required for reading the data in the recorded area A2 P times is:

$$P\times(N\times TcA2+b\times Ts).$$

Where the time period required for reading the data in the recorded area V2 the i'th time is TcV2(i), the time period required for reading the data in the recorded area V2 P times is:

$$P\times a\times Ts+\Sigma TcV2(i)$$

where $\Sigma$ is i=1 through P.

Where the time period required for reading one channel of audio data in the recorded area A3 is TcA, the time period required for reading the data in the recorded area A3 is:

$$N\times TcA+b\times Ts.$$

The time required for reading the data in the recorded area 124 is:

$$ToutV3+a\times Ts.$$

Where the time period required from the start of reproduction until the start of the seek operation is TREAD, TREAD is represented by the following expression.

$$TREAD=TprV1+a\times Ts+P\times(N\times TcA2+b\times Ts+a\times Ts)+\Sigma TcV2(i)+N\times TcA+b\times Ts+ToutV3+a\times Ts$$

where $\Sigma$ is i=1 through P.

The remaining data amount in the first track buffer section 610 at the start of the seek operation, converted into the time, corresponds to the difference between the time period TDEC until all the read video data is consumed by the decoder and the time period TREAD from the start of reproduction until the start of the seek operation. Accordingly, the remaining data amount in the first track buffer section 610 at the start of the seek operation, converted into the time, is TBUFA, TBUFA is represented by:

$$TBUFA=TDEC-TREAD.$$

In part (d) of FIG. 1, TBUFA is represented by a time 181.

There is a prescribed delay time TdlyA before the data remaining in the first track buffer section 610 at the start of the seek operation is decoded and output by the first decoding section 612. This delay time is represented as the time 180 in part (d) of FIG. 1. Accordingly, where the time period in which the first decoding section 612 can output the frame data using the remaining data in the first track buffer section 610 at the start of the seek operation is TA, TA is represented by:

$$TA=TBUFA+TdlyA.$$

By substituting TBUFA, $$TA=TDEC-TREAD+TdlyA.$$

By substituting TDEC and TREAD, TA is represented by the following expression.

$$TA=V1pr/VdV1pr+\Sigma(V2(i)/VdV2(i))+V3out/VdV3out-(TprV1+a\times Ts+P\times(N\times TcA2+b\times Ts+a\times Ts)+\Sigma TcV2(i)+N\times TcA+b\times Ts+ToutV3+a\times Ts))+TdlyA$$

where $\Sigma$ is i=1 through P.

Next, the time period required from the start of the seek operation until the frame, in which the "in" point is set, is allowed to be output from the second decoding section 722 is obtained. In FIG. 1, the time period required for a seek operation Ta1 from the end of the recorded area 124 to the beginning of the recorded area 131 is Tf(2). Where the time period required for reading one channel of audio data in the recorded area 131 is TinA, the number of channels of audio data is N, and the number of defective ECC blocks to be skipped in the recorded areas of the audio data is b, the time period required for reading the data in the recorded area 131 is:

$$N\times TinA+b\times Ts.$$

The time period required for a fine seek operation from the end of the recorded area 131 to the beginning of the recorded area 132 is Tf(3).

Based on the above, the time period from the start of the seek operation until the pickup reaches the beginning of the recorded area 132 of the video data is:

$$Tf(2)+N\times TinA+b\times Ts+Tf(3).$$

This time period is represented as the delay time 190 in part (e) of FIG. 1. There is a prescribed delay time TdlyB before the read video data in the recorded area 132 is decoded and output by the second decoding section 722. This delay time, TdlyB, is represented as the delay time 191 in part (e) of FIG. 1. In order to output the frame in which the "in" point is set, it is necessary to decode frames before the frames in which the "in" point is set. The time period required for this pre-decoding processing is Tin. Tin is represented by the delay time 192 in part (e) of FIG. 1. Based on the above, where the time period from the start of the seek operation until the frame, in which the "in" point is set, is allowed to be output from the second decoding section 722 is TB, TB is represented by:

$$TB=Tf(2)+N \times TinA+b \times Ts+Tf(3)+TdlyB+Tin.$$

In the case where the amount of effective video data in the recorded area 132 is small, it should be considered that no video data is read from the portion from the end of the recorded area 132 to the beginning of the next recorded area of the video data (recorded area V5). In this case, the time period required for reading the data in the recorded area A5 of the audio data, i.e., N×TcA+b×Ts may be added to TB.

Based on the above, as long as the time period TA (in which the first decoding section 612 can output data using the data remaining in the first track buffer section 610 at the start of the seek operation) and the time period TB (from the start of the seek operation until the frame in which the "in" point is set is allowed to be output from the second decoding section 722) have the relationship of TA≧TB, the frame in which the "out" point is set (the data output by the first decoding section 612) and the frame in which the "in" point is set (the data output by the second decoding section 722) are continuous to each other seamlessly. Based on the expression of the relationship between TA and TB and also on the expressions representing TA and TB, the cut-editing condition for seamless reproduction is represented by the following expression.

$$\{V1pr/VdV1pr+\Sigma(V2(i)/VdV2(i))+V3out/VdV3out-\\(TprV1+a \times Ts+P \times (N \times TcA2+b \times Ts+a \times Ts)+\Sigma TcV2\\(i)+N \times TcA+b \times Ts+ToutV3+a \times Ts))+TdlyA\} \geq \{Tf\\(2)+N \times TinA+b \times Ts+Tf(3)+TdlyB+Tin+N \times TcA+b \times\\Ts\}$$

where Σ is i=1 through P.

This is the cut-editing condition according to the present invention. The expressions used are summarized as follows.

The cut-editing condition for seamless reproduction is represented by: TA≧TB.

TA is a first time period from the start of the seek operation of the pickup 601 from the "out" point to the "in" point, until the end of the output of the first decoded data 617 by the first decoding section 612. TB is a second time period from the start of the seek operation of the pickup 601 until the second decoded data 618 is allowed to be output by the second decoding section 722. TA is represented by:

$$TA=TBUFA+TdlyA.$$

The first real time data 615 includes a plurality of data portions between the "pr" point and the "out" point. The plurality of data portions are video data and audio data which are recorded discretely. The plurality of data portions are, for example, frames or GOPs. TdlyA is a delay time representing the sum of (i) the time period in which one of the plurality of data portions is accumulated in the first VBV buffer section 611 and (ii) the time period from one of the plurality of data portions is input to the first decoding section 612 until the first decoding section 612 outputs the first decoded data 617, which is generated by the first decoding section 612 by decoding one of the plurality of data portions.

TBUFA is represented by:

$$TBUFA=TDEC-TREAD.$$

Each of the plurality of data portions is associated with a bit rate. For example, the bit rate associated with an m'th data portion (m is an integer) among the plurality of data portions is different from the bit rate associated with an n'th data portion (n is an integer different from m) among the plurality of data portions. TDEC is a time period representing a sum of a plurality of time periods which are obtained by dividing the data amount of each of the plurality of data portions by each of bit rates associated therewith. TDEC is represented by:

$$TDEC=\Sigma(V(i)/VdV(i)).$$

V(i) is the data amount of the i'th data portion (i is an integer) among the plurality of data portions. VdV(i) is the bit rate associated with the i'th data portion.

TREAD is a time period required for reading the data of the first real time data 615 from "pr" point to the "out" point. TREAD is represented by:

$$TREAD=\Sigma(TR(i)+a(i) \times Ts).$$

TR(i) is a time period required for reading the i'th data portion a(i) is the number of defective ECC blocks in the area in which the i'th data portion is recorded. Ts is a time period required for skipping one ECC block.

In summary, TA is represented by the following expression.

$$TA=\Sigma(V(i)/VdV(i))-\Sigma(TR(i)+a(i) \times Ts)+TdlyA$$

Next, the second time period TB is represented by:

$$TB=Tf+Tb+TdlyB+Tin.$$

Tf is the time period required for the seek operation of the reading section from the "out" point to the "in" point. Tb is the time period required for reading the data which is readable during a period from the start of the seek operation until the data corresponding to the "in" point is read. (For example, Tb includes N×TinA+b×Ts; Tb may further include Tf(3).) TdlyB is a delay time representing the sum of (i) the time period in which at least a portion of the second real time data 616 is accumulated in the second buffer sections 614 and (ii) the time period from when at least a portion of the second real time data 616 is input to the second decoding section 722 until the second decoding section 722 outputs the second decoded data 618, which is generated by the second decoding section 722 by decoding at least a portion of the second real time data 616. Tin is a time period required for pre-decoding processing performed in order to obtain prescribed data (I frame, P frame, etc.) used for decoding the data in the second real time data 616 corresponding to the "in" point.

According to the cut-editing condition of the present invention, TdlyA and TdlyB are included in the expression representing the cut-editing condition as a delay element in consideration of the decoding model in a compression system such as MPEG or the like. In addition, it is considered that the video data has a variable bit rate (VBR). Specifically, the expression representing the cut-editing condition represents the reproduction time, in the state where each piece of video data is decoded, in separate terms in consideration of the bit rate of each piece of video data, not the maximum bit rate of the video data. Owing to these, the precision of determination on whether seamless reproduction of the edited data is possible or not is significantly improved as compared to the conventional art.

Figure 11:
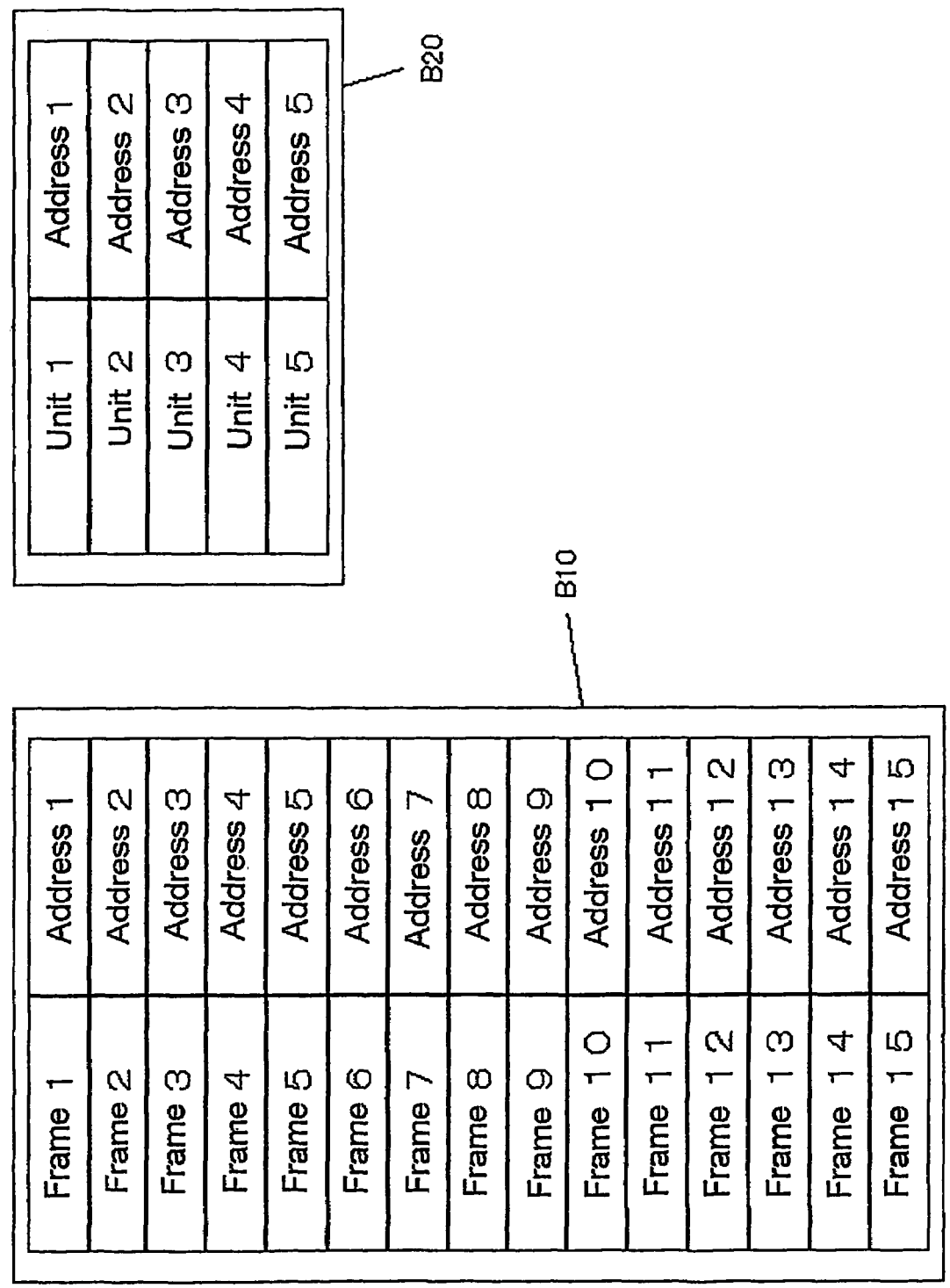
FIG. 11 shows a table for managing frame data in a GOP which is grouped into units according to the present invention.

In order to reproduce video data in correspondence with the variable bit rate (VBR), it is necessary to check the data amount per prescribed zone of the video data actually recorded on the information recording medium. This is possible according to the present invention by providing a table as shown in FIG. 11, which will be described below.

FIG. 14 is a flowchart illustrating the above-described procedure for obtaining the cut-editing condition of the present invention. The procedure start in step E10. In step E20, the remaining buffer data amount at the "out" point is calculated. Step E20 corresponds to obtaining TBUFA, i.e., the remaining data amount in the first track buffer 610 at the start of the seek operation, which is converted into time. In step E30, the time period TA (in which data can be reproduced using the remaining buffer data amount) is calculated. Step E30 corresponds to obtaining TA=TDEC−TREAD+TdlyA. In step E40, the time period TB (the sum of (i) the calculated seek time and (ii) the delay time until the data for which the "in" point is set is output). Step E40 corresponds to obtaining TB=Tf(2)+N×TinA+b×Ts+Tf(3)+TdlyB+Tin. In step E50, TA obtained in step E30 and TB obtained in E40 are compared with each other. Step E50 corresponds to determining whether or not TA 2 TB. This determination result shows whether the cut-editing condition is fulfilled or not. When the cut-editing condition is fulfilled as the result of the determination in step E50, the procedure goes to step E60. In step E60, it is determined that seamless reproduction is possible. When the cut-editing condition is not fulfilled as the result of the determination in step E50, the procedure goes to step E61. In step E61, it is determined that seamless reproduction is impossible.

As described above, an editing method according to the present invention includes the steps of: setting an "out" point in the first real time data; setting an "in" point in the second real time data; and calculating (i) the first time period from the start of the seek operation of the pickup from the "out" point to the "in" point until the end of the output of the first decoded data by the first decoding section and (ii) the second time period from the start of the seek operation until the second decoded data is allowed to be output by the second decoding section, and then comparing the length of the calculated first time period and the length of the calculated second time period. In the step of comparing, it is determined whether or not TA≧TB. When the cut-editing condition (TA≧TB) is not fulfilled, at least a portion of the real time data may be moved to an area realizing a shorter seek time so as to fulfill the cut-editing condition.

The information recording medium 600 according to the present invention includes the first real time data and the second real time data which are arranged so as to fulfill the cut-editing condition (TA≧TB). An "out" point is set in the first real time data and an "in" point is set in the second real time data, so as to fulfill the cut-editing condition (TA≧TB). According to a reproduction method of the present invention, the first real time data and the second real time data are reproduced from the information recording medium 600 having such a structure.

According to a recording method of the present invention, at lease one of, at least a portion of the first real time data or at least a portion of the second real time data, is recorded on the information recording medium 600, so as to fulfill the cut-editing condition (TA≧TB). A recording method according to the present invention includes the steps of: determining whether an empty area is settable so as to fulfill the cut-editing condition or not; and recording the real time data in the empty area which is determined to be settable.

Figure 15A:
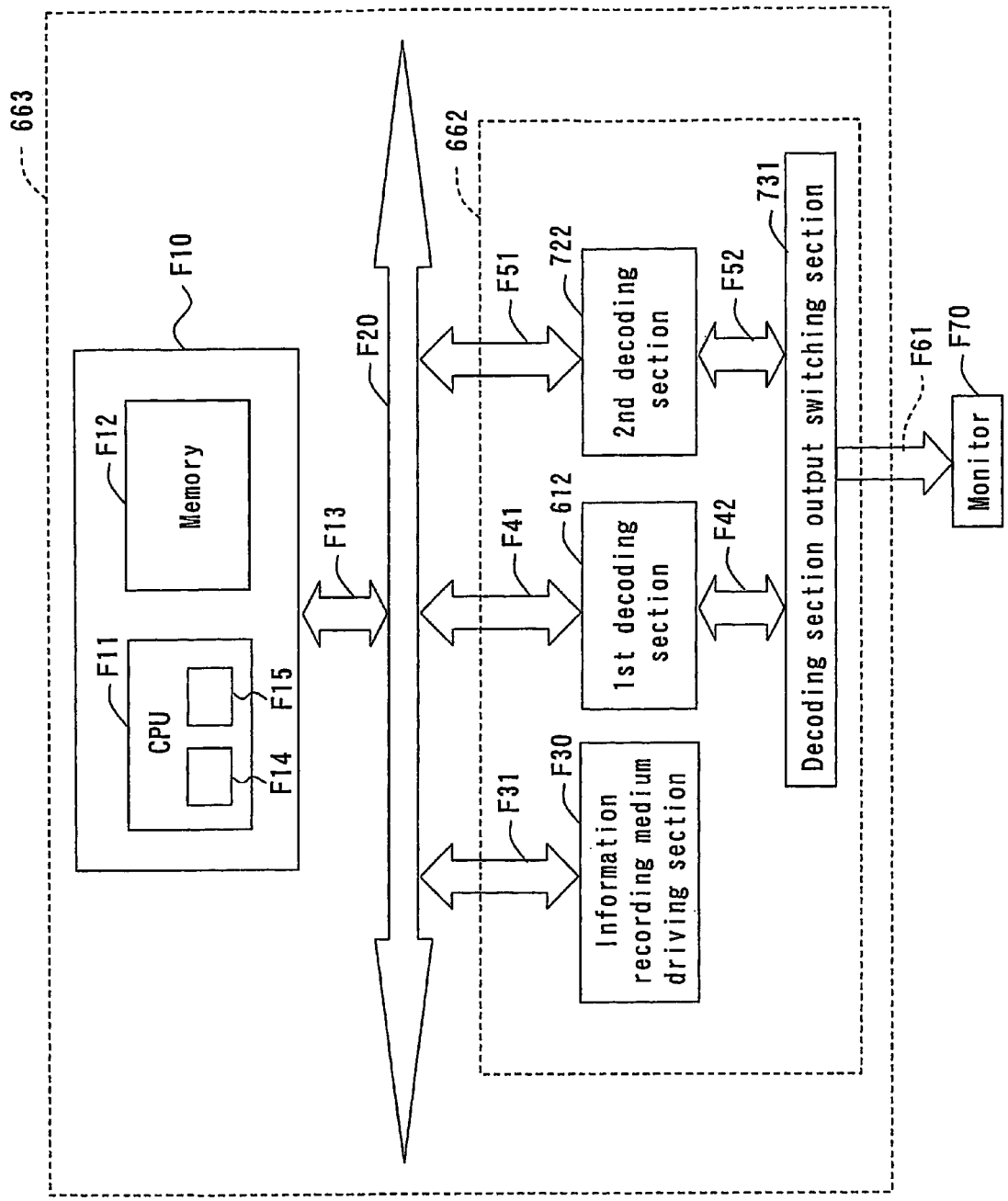
FIG. 15A is a block diagram of an information recording and reproduction apparatus having an editing function according to the present invention.

FIG. 15A is a block diagram of an information recording and reproduction apparatus 663 having an editing function according to the present invention. The information recording and reproduction apparatus 663 includes a control section F10, the multiple decoder reproduction apparatus 662, a bus section F20, and interface sections F13, F31, F41 and F51.

The control section F10 includes a CPU F11 and a memory section F12. The CPU F11 includes a first setting section F14 for setting an "out" point in the first real time data, and a second setting section F15 for setting an "in" point in the second real time data. The first setting section F14 and the second setting section F15 may be provided outside the control section F10.

FIG. 15A does not show some elements of the multiple decoder reproduction apparatus 662, i.e., the first buffer section 613, the second buffer section 614 and the read data switching section 730, for the sake of simplicity. The pickup 601 is provided inside an information recording medium driving section F30 of the information recording and reproduction apparatus 663. The information recording medium driving section F30 is, for example, a disc drive. The multiple decoder reproduction apparatus 662 shown in FIG. 15A includes decoding section output interfaces F42 and F52 and an output interface F61 to a monitor F70.

The above-described editing method, recording method and reproduction method are executed by the information recording and reproduction apparatus 663 including the control section F10. The control section F10 calculates the first time period TA and the second time period TB, compares the length of the calculated first time period TA with the length of the calculated second time period TB, and determines whether or not TA≧TB.

The pickup 601 provided inside the information recording medium driving section F30 also acts as a writing section for writing at least one of, at least a portion of the first real time data 615 and at least a portion of the second real time data 616 on the information recording medium 600. The writing section may be provided separately from the pickup 601.

The control section F10 controls the pickup 601 to write at least one of, at least a portion of the first real time data 615 and at least a portion of the second real time data 616 on the information recording medium 600, such that the length of the first time period TA is greater than or equal to the length of the second time period TB.

When determining that the length of the calculated first time period TA is shorter than the length of the calculated second time period TB, the control section Flo controls the pickup 601 to change the recording position on the information recording medium 600 of at least one of, at least a portion of the first real time data 615 and at least a portion of the second real time data 616, such that the length of the first time period TA is greater than or equal to the length of the second time period TB.

Alternatively, the control section F10 may control the pickup 601 to change the recording position of one of at least a portion of the first real time data 615 or at least a portion of the second real time data 616 which has a smaller data amount.

During a recording operation and an editing operation, there can be a case where the first real time data 615 includes first audio data and first video data and the second real time data 616 includes second audio data and second video data. In such a case, the control section F10 may control the pickup 601 to record the first audio data and the second audio data adjacently to each other on the information recording medium 600 and also to record the first video data and the second video data adjacently to each other on the information recording medium 600.

The rearrangement of the first audio data and the second audio data will be described in detail below.

The control section F10 checks data arrangement information and editing information included in the information recording medium 600, which are stored in the information recording medium driving section F30, and determines whether seamless reproduction is possible or not. Then, the control section F10 instructs the information recording medium driving section F30 to reproduce desired data. The reproduced data is input to the multiple decoder reproduction apparatus 622 via the bus section F20. The input data is input to the first decoding section 612 via the first buffer section 613

(FIG. 7) or to the second decoding section 722 via the second buffer section 614 (FIG. 7). The decoded data which is processed by one of the plurality of decoders and then output is transferred to a decoding section output switching section 731. The decoding section output switching section 731 switches the decoded data from the plurality of decoders at a desired timing. Thus, the plurality of pieces of decoded data processed by different decoders are continued seamlessly, and sent to the monitor F70 to be displayed. The decoding section output switching section 731 may have an interface section (not shown) with the bus section F20 in order to exchange information with the decoding sections 612 and 722 and the control section F10. The decoding section output switching section 731 may use a frame memory or the like to adjust the time difference between the data output from the decoders before the data is output to the monitor F70. FIG. 15A shows two decoding sections, but more than two decoding sections maybe included.

Figure 15B:
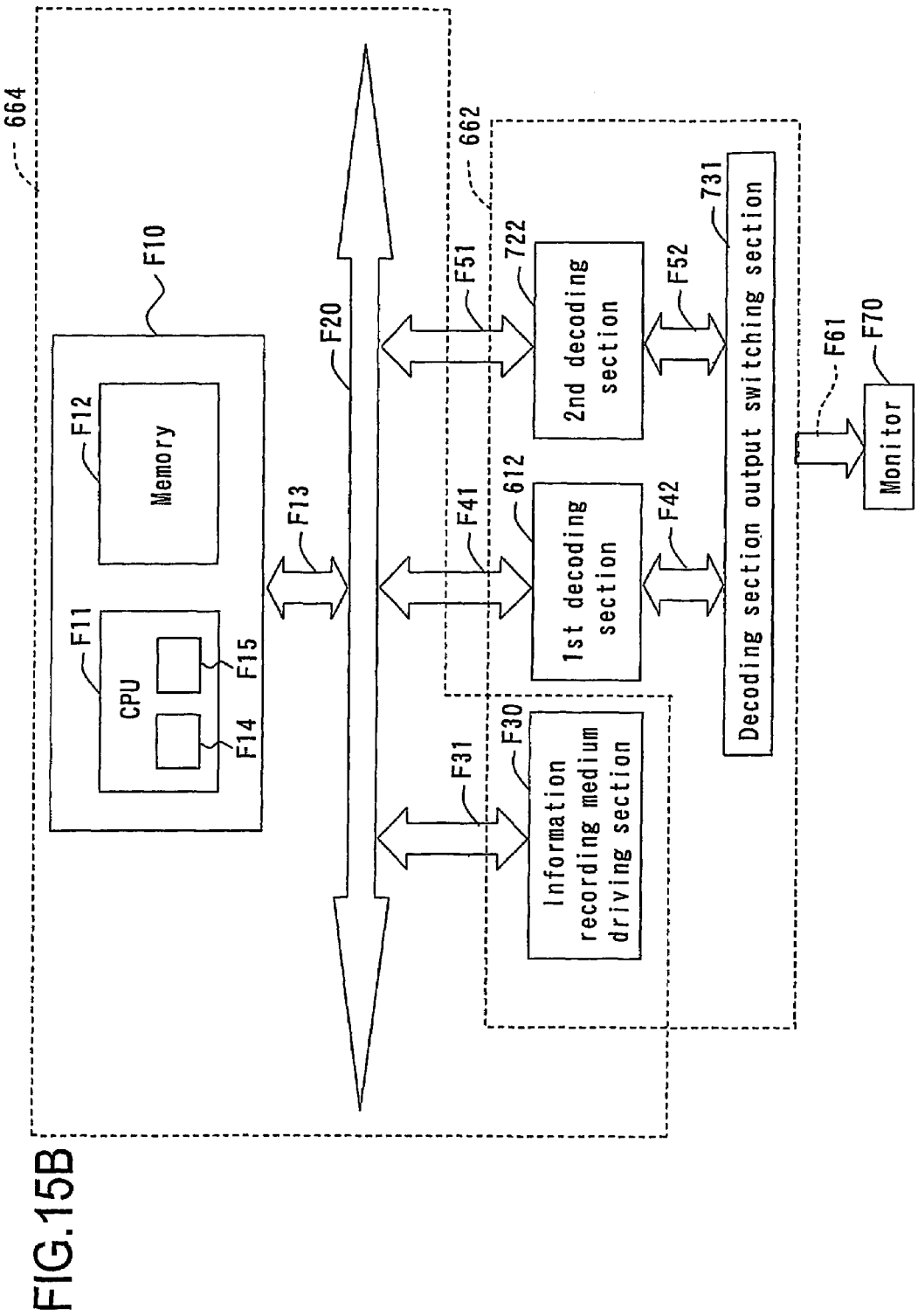
FIG. 15B is a block diagram of a recording apparatus having an editing function according to the present invention.

FIG. 15B is a block diagram of a recording apparatus 664 having an editing function according to the present invention. In FIG. 15B, a part of the multiple decoder reproduction apparatus 662 (shown in FIG. 15A) is omitted for the sake of simplicity. The recording apparatus 664 includes a control section F1, a bus section F20, and interface sections F13, F31, F41 and F51. The above-described editing method and recording method are executed by the recording apparatus 664 including the control section F10. The operation of each element is as described above with reference to FIG. 15A. The recording apparatus 664 includes an information recording medium driving section F30. In the case where the recording apparatus 664 and the multiple decoder reproduction apparatus 662 are provided in the same housing, the information recording medium driving section F30 is shared by the recording apparatus 664 and the multiple decoder reproduction apparatus 662. In the case where the recording apparatus 664 and the multiple decoder reproduction apparatus 662 are provided in separate housings, the information recording medium driving section F30 is provided in each of the recording apparatus 664 and the multiple decoder reproduction apparatus 662. The pickup 601 provided inside the information recording medium driving section F30 acts as both a reading section and a writing section. The reading section and the writing section may be separately provided.

Figure 15C:
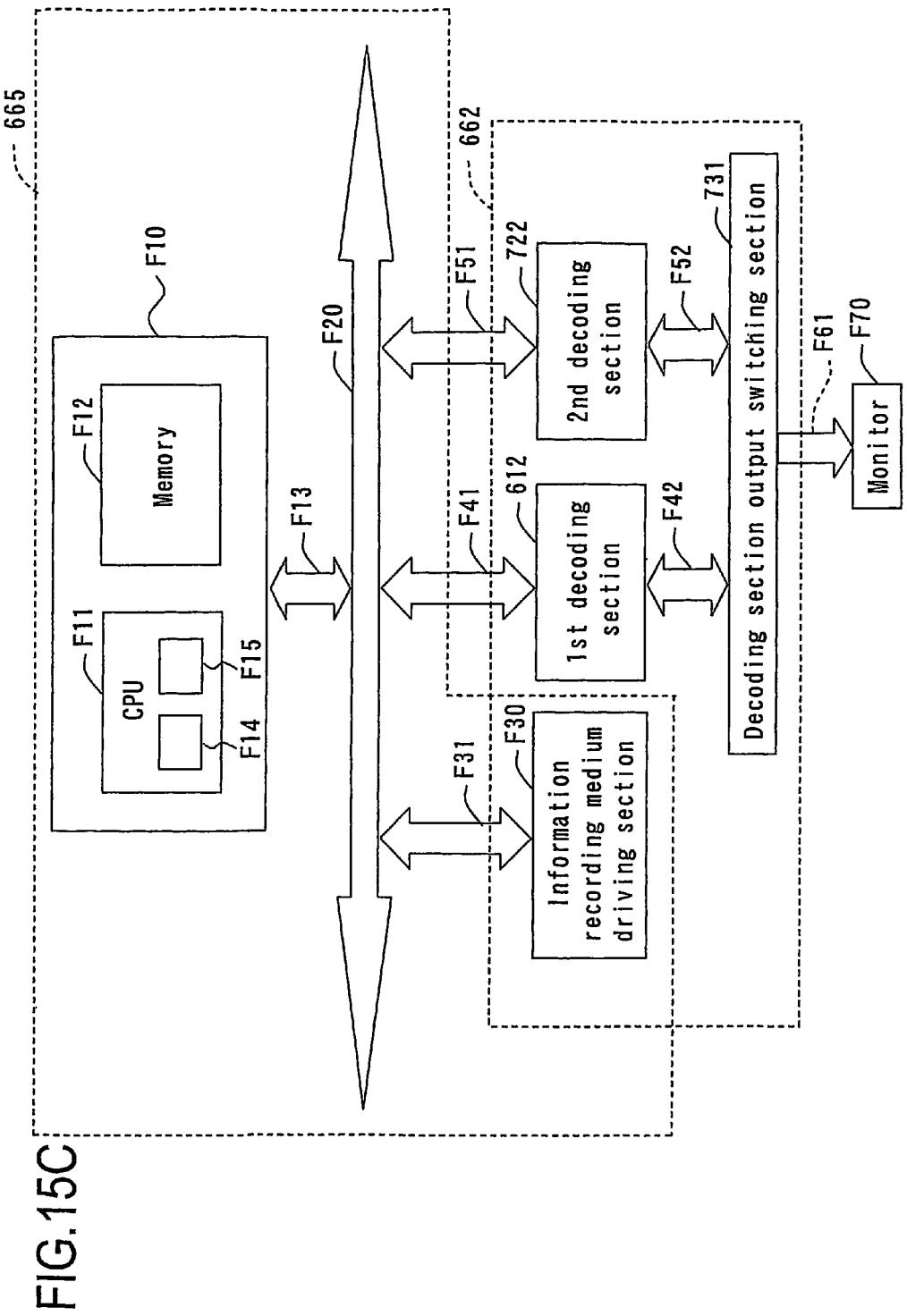
FIG. 15C is a block diagram of an editing apparatus having an editing function according to the present invention.
Figure 16:
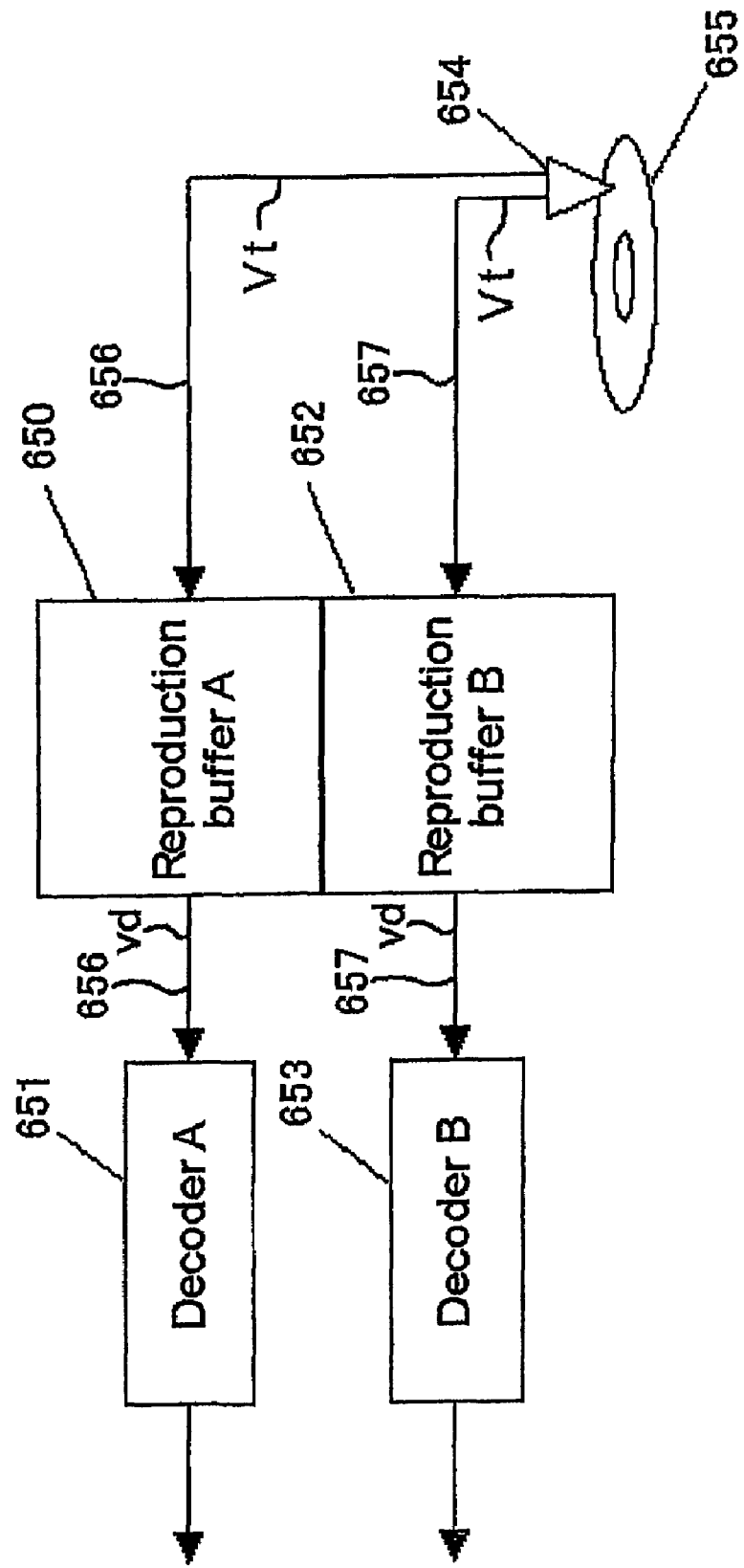
FIG. 16 shows an apparatus for simultaneous reproduction.
Figure 17:
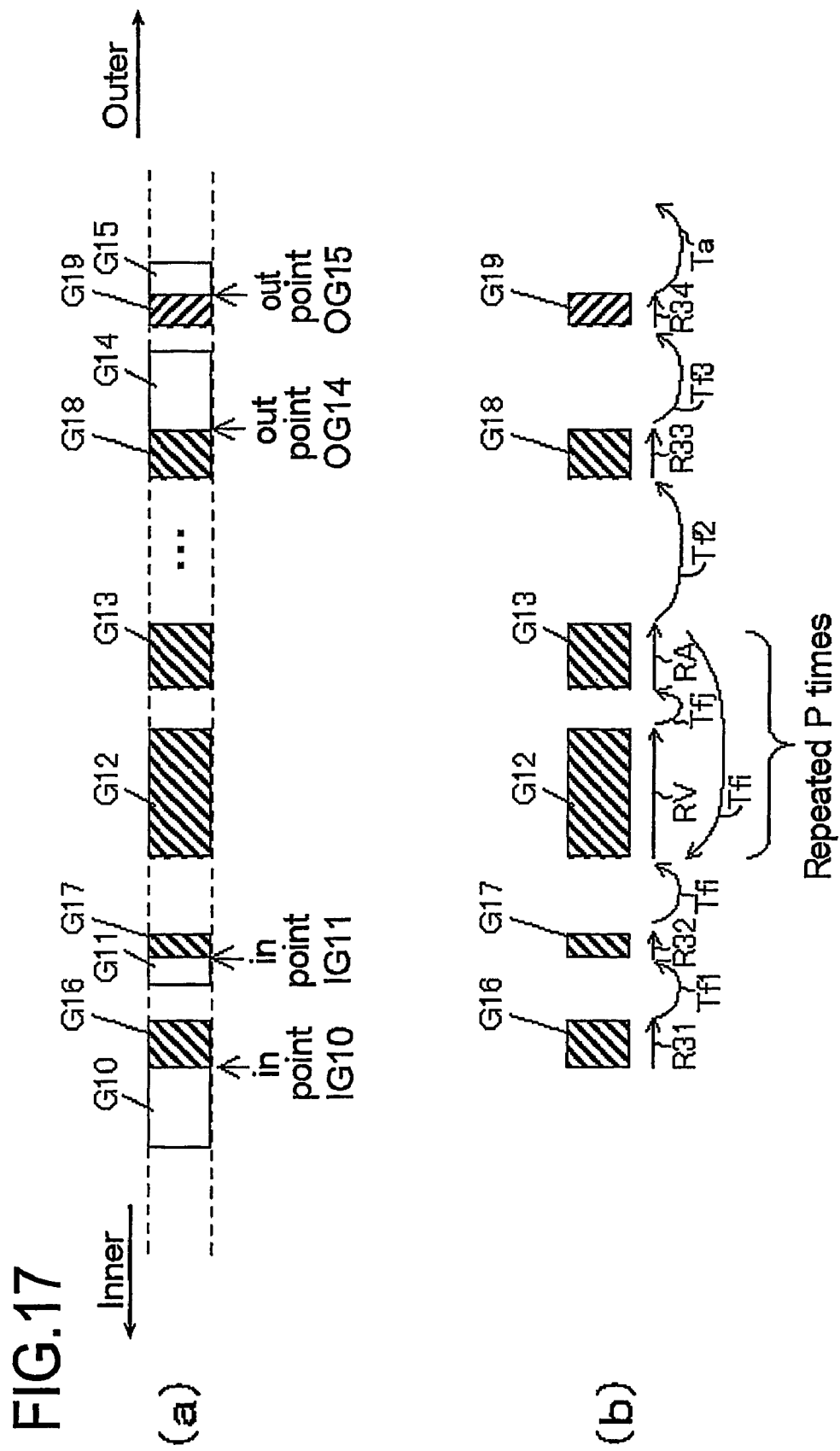
FIG. 17 shows an example of cut-editing which is performed on a continuous recorded area by a unit including a plurality of pieces of audio data and a plurality of pieces of video data.

FIG. 15C is a block diagram of an editing apparatus 665 having an editing function according to the present invention. In FIG. 15C, a part of the multiple decoder reproduction apparatus 662 (shown in FIG. 15A) is omitted for the sake of simplicity. The editing apparatus 665 includes a control section F10, a bus section F20, and interface sections F13, F31, F41 and F51. The above-described editing method is executed by the editing apparatus 665 including the control section F10. The operation of each element is as described above with reference to FIG. 15A. The editing apparatus 665 includes an information recording medium driving section F30. In the case where the editing apparatus 665 and the multiple decoder reproduction apparatus 662 are provided in the same housing, the information recording medium driving section F30 is shared by the editing apparatus 665 and the multiple decoder reproduction apparatus 662. In the case where the editing apparatus 665 and the multiple decoder reproduction apparatus 662 are provided in separate housings, the information recording medium driving section F30 is provided in each of the editing apparatus 665 and the multiple decoder reproduction apparatus 662. The pickup 601 provided inside the information recording medium driving section F30 acts as both a reading section and a writing section. The reading section and the writing section may be separately provided.

The information recording medium 600 may be a semiconductor memory device. A semiconductor memory device is, for example, a nonvolatile memory medium such as, for example, an SD memory card. In this case, the information recording medium driving section F30 is, for example, a memory drive, and the pickup 601 is substituted with a memory reading section for reading data from the semiconductor memory medium and a memory writing section for writing data to the semiconductor memory device. In the case of a semiconductor memory medium as in other mediums, the access speed is reduced for random access between memory cells far from each other. By applying the present invention, the access speed can be improved. Especially, the data rearrangement of the present invention is useful for a semiconductor memory medium.

The information recording medium driving section F30 may be a hard disc device. In this case, the information recording medium 600 may be a magnetic disc medium, and the pickup 601 is substituted with a reading section for reading data from a magnetic disc medium and a writing section for writing data to the magnetic disc medium. The effect provided by the present invention in this case is substantially the same as the effect in the case where the information recording medium 600 is an optical disc.

Figure 3:
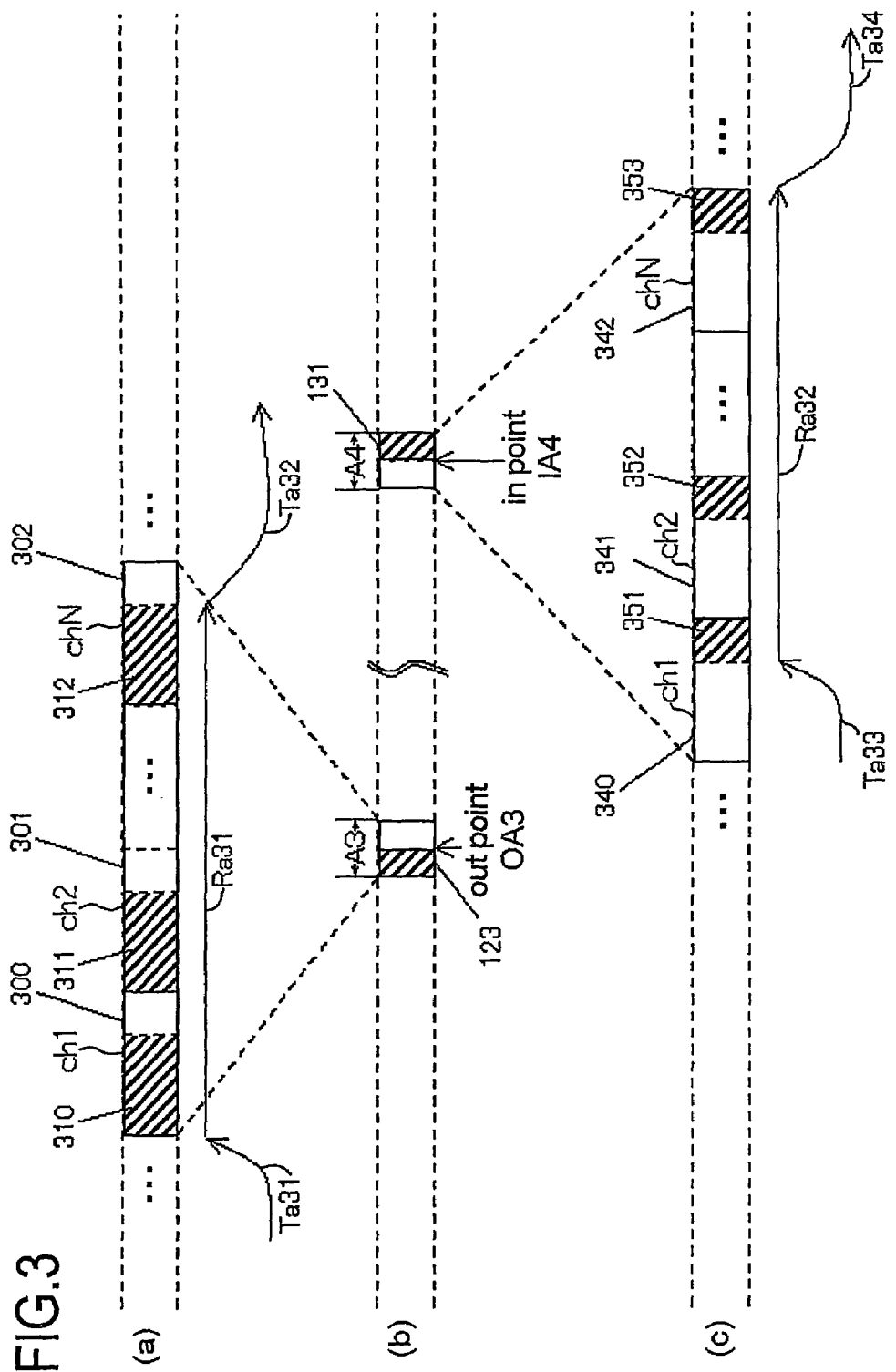
FIG. 3 shows an access operation to audio data according to the present invention.

FIG. 3 shows a seek operation of the pickup at the "in" point and the "out" point of the audio data. Part (b) of FIG. 3 shows recorded areas of the information recording medium 600. The recorded areas A3 and A4 of audio data in which the "in" point and the "out" point are set are the same as those shown in FIGS. 1 and 2.

Part (a) of FIG. 3 is an enlarged view of the recorded area A3 of the audio data in which the "out" point OA3 is set. In part (a) of FIG. 3, multi-channel audio data (ch1 audio data 300, ch2 audio data 301, and chN audio data 302) is recorded in the recorded areas of the audio data. When the "out" point is set in the recorded area of the audio data, the "out" point is present in each channel. The ch1 audio data 300 includes audio data 310 up to the "out" point. The ch2 audio data 301 includes audio data 311 up to the "out" point. The chN audio data 302 includes audio data 312 up to the "out" point.

The time period required for reproducing the audio data of each channel up to the "out" point is as follows. The pickup reaches the beginning of the ch1 audio data after a seek time Ta31 to this audio data. In the case where the immediately previous data is continuous to this audio data, the seek time Ta31 may be zero. Next, the audio data 310 up to the "out" point in the ch1 audio data is reproduced. Then, the audio data 311 up to the "out" point in the ch2 audio data is reproduced. The portion between the "out" point in the ch1 audio data 311 and the beginning of the audio data 311 includes audio data which does not need to be reproduced. Since audio data has a smaller data amount than video data, the information recording medium 600 is allowed to rotate without the data being read and without a seek operation such as a fine-seek operation being performed, until the pickup reaches the beginning of the audio data 311. The same processing is performed for the other channels, and the data is continuously reproduced up to the end of the audio data 312, i.e., the "out" point of the chN audio data. The time period required for continuously reproducing the data from the beginning of audio data 310 to the end of the audio data 312 is Ra31. Then, a seek operation is performed in a time Ta32 to the next "in" point.

Part (c) of FIG. 3 is an enlarged view of the recorded area A4 of the audio data in which the "in" point IA4 is set. In part (c) of FIG. 3, multi-channel audio data (ch1 audio data 340, ch2 audio data 341, and chN audio data 342) is recorded in the recorded areas of the audio data. When the "in" point is set in the recorded area of the audio data, the "in" point is present in each channel. The ch1 audio data 340 includes audio data 351 after the "in" point. The ch2 audio data 341 includes audio data 352 after the "in" point. The chN audio data 342 includes audio data 353 after the "in" point.

The time period required for reproducing the audio data of each channel from the "in" point is as follows. The pickup reaches the beginning of the ch1 audio data 351, which is after the "in" point in ch1 audio data, after a seek time Ta33 to this audio data. Then, the audio data 351, which is after the "in" point in ch1 audio-data, is reproduced.

Next, the audio data 352, which is after the "in" point in ch2 audio data, is reproduced. The portion between the end of the audio data 351 and the "in" point of the ch2 audio data includes audio data which does not need to be reproduced. Since audio data has a smaller data amount than video data, the information recording medium 600 is allowed to rotate without the data being read and without a seek operation such as a fine-seek operation being performed, until the pickup reaches the beginning of the audio data 352. The same processing is performed for the other channels, and the data is continuously reproduced up to the end of the audio data 353, i.e., after the "in" point of the chN audio data. The time period required for continuously reproducing the data from the beginning of audio data 351 to the end of the audio data 353 is Ra32. Then, a seek operation is performed in a time Ta34 to the next "in" point.

Figure 4:
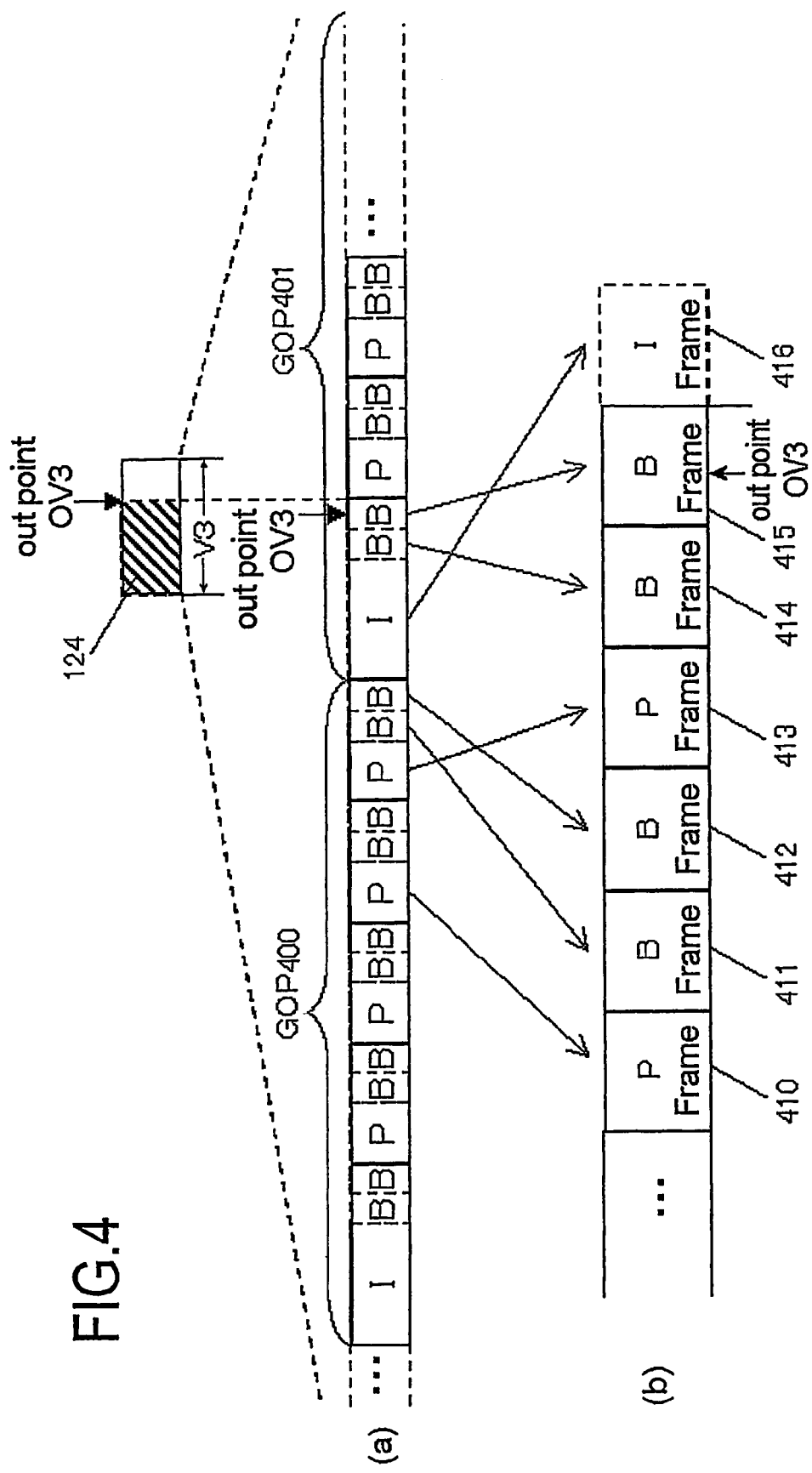
FIG. 4 shows an access operation to video data according to the present invention.

FIG. 4 shows a seek operation of the pickup at the "out" point of the video data. Since data compressed by MPEG has a GOP structure, it is necessary to consider the order of the I frame data, P frame data, and B frame data on the information recording medium, and the order of the frame video which is output from the decoding section.

In part (a) of FIG. 4, video data which is necessary to reproduce the data from the beginning of the recorded area V3 to the "out" point OV3 thereof is recorded in the recorded area 124 in the recorded area V3. A GOP 400 is immediately before the "out" point OV3. A GOP 401 is the GOP in which the "out" point OV3 is set. Part (b) of FIG. 4 shows outputs of frames 410 through 416, which are in the vicinity of the "out" point OV3 among the frames included in the GOP 400 and the GOP 401.

As can be appreciated from comparing part (a) and part (b) of FIG. 4, the order of frames arranged in the information recording medium and the order of frames output from the decoding section are different from each other. For example, in the case where a frame 415 which is selected as the frame in which the "out" point OV3 is set is a B frame, an I frame 416 which is arranged before the B frame 415 is read before the B frame 415, but the B frame 415 is to be output before the I frame 416. The I frame 416 is necessary to decode the B frame 415 in which the "out" point OV3 is set, but is to be displayed after the "out" point OV3. Therefore, the I frame 416 is decoded but is not output. In order to continuously display the frame in which the "out" point is set and the frame in which the "in" point is set without interruption, it is necessary to accurately calculate the delay time regarding the time when the data of the frame in which the "out" point is set is output.

The present invention considers the delay time caused by the order of the frames which are output by the decoding section. Specifically, as described with reference to FIG. 1, the delay element TdlyA of the first decoding section 612 for decoding the data at the "out" point includes a delay element generated by the order of frame data output. In actual MPEG data, data of each frame is provided with DTS representing the time to decode and PTS representing the time to output. By using such time data, the delay element TdlyA can be specifically calculated.

Figure 5:
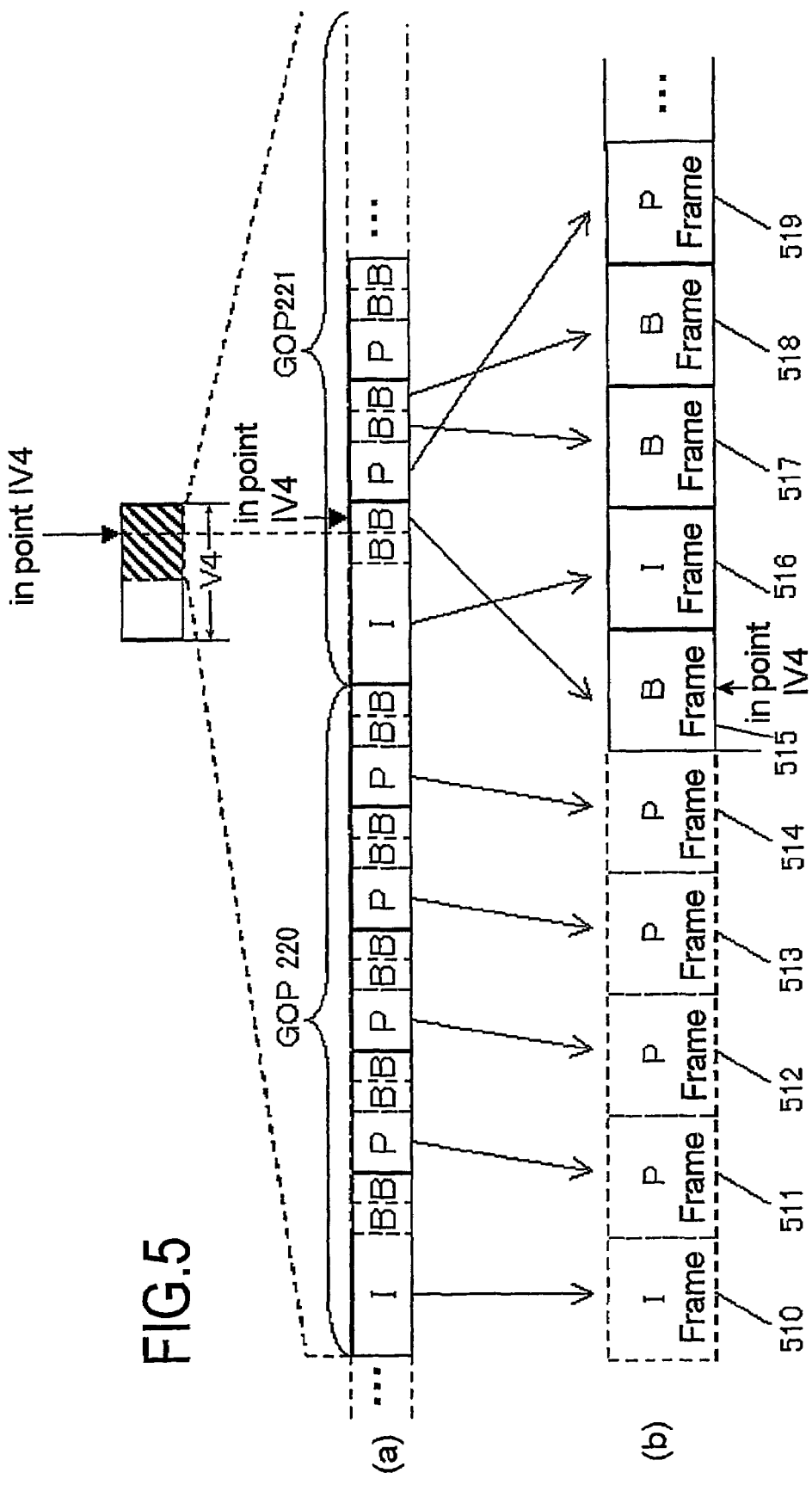
FIG. 5 shows an access operation to video data according to the present invention.

FIG. 5 shows a seek operation of the pickup at the "in" point of the video data. Like in the case of FIG. 4, it is necessary to consider the order of the I frame data, P frame data, and B frame data on the information recording medium, and the order of the frame video which is output from the decoding section.

In part (a) of FIG. 5, the recorded area 215 in the recorded area V4 of the video data represents the region from a position slightly before the "in" point IV4 in the recorded area V4 to the end of the recorded area V4. A GOP 220 is immediately before the GOP including the frame in which the "in" point IV4 is set. A GOP 221 is the GOP in which the "in" point IV4 is set. Part (b) of FIG. 5 shows outputs from frames 510 through 519, which are in the vicinity of the "in" point IV4 among the frames included in the GOP 220 and the GOP 221.

Like in the case of FIG. 4, the order of frames arranged in the information recording medium and the order of frames output from the decoding section are different from each other. As described above with reference to part (b) of FIG. 2, in order to decode the frame in which the "in" point is set, several frames before the "in" point may need to be decoded beforehand. FIG. 5 shows the case where a B frame 515, in which the "in" point IV4 is set, is in the vicinity of the beginning of the GOP 221. In order to decode the frame 515, it is necessary to decode an I frame 516 in the GOP 221 in which the "in" point IV4 is set, and also to decode I frames and P frames in the GOP 220. Accordingly, frames 510 through 514 and 516 need to be decoded beforehand. Among these frames, the frames 510 through 514 which are to be displayed before the "in" point IV4 are decoded but not output. After the frame 515, frames 517 through 519 are decoded.

As described above, in order to output the frame in which the "in" point is set, it is necessary to accurately calculate the delay time caused by the order of the frames which are output by the decoding section and the delay time generated by decoding several frames before the "in" point. Especially in order to continuously display the frame in which the "out" point is set and the frame in which the "in" point is set without interruption for seamless reproduction, it is necessary to accurately calculate the delay time regarding the time when the data of the frame in which the "in" point is set is output.

The present invention considers the delay time caused by the order of the frames which are output by the decoding section, and the delay time caused by decoding several frames before the "in" point. Specifically, as described with reference to FIG. 1, the delay element TdlyB (in the expression representing the condition for cut-editing) of the second decoding section 722 for decoding the data at the "in" point includes a delay element generated by the order of frame data output. Tin in the same expression includes the delay element caused by decoding several frames before the "in" point. Namely, Tin includes the time period required for decoding the I frame 510, the P frames 511 through 514, and the I frame 516.

In actual MPEG data, data of each frame is provided with DTS representing the time to decode and PTS representing the time to output. By using such time data, the delay element TdlyB can be specifically calculated. A usual decoding section performs decoding processing frame by frame. Therefore, the delay element Tin can be calculated by checking the number of I frames or P frames before the "in" point.

Next, the time period required for outputting video data from the decoding section in the multiple decoder reproduction apparatus 622 shown in FIG. 7 will be described.

Figure 8:
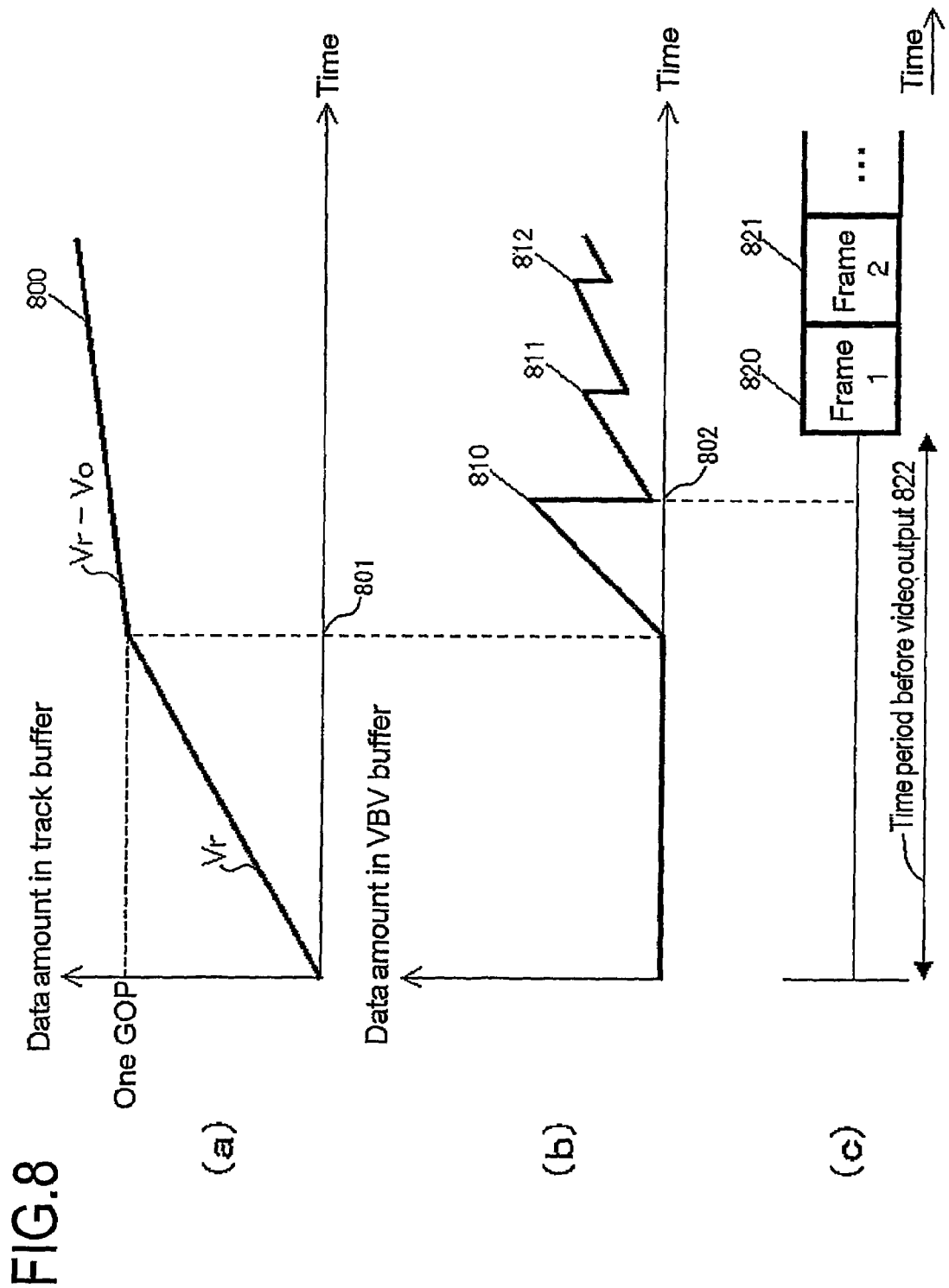
FIG. 8 shows output timing with a conventional decoding model.

FIG. 8 shows a time period required for outputting video data with a conventional decoding model. In part (a) of FIG. 8, the vertical axis represents the data amount in the track buffer section, and the horizontal axis represents the time. In part (b) of FIG. 8, the vertical axis represents the data amount in the VBV buffer section, and the horizontal axis represents the time. Part (c) of FIG. 8 shows a frame output from the decoding section in accordance with time (horizontal axis).

In FIG. 8, solid line 800 represents a change in the data amount in the track buffer section. Data 810, 811 and 812 represent data corresponding to frame 1, frame 2 and frame 3 accumulated in the VBV buffer section, respectively. Data 820 and 821 respectively represent frame 1 and frame 2 among frame outputs from the decoding section.

In a normal state, data which is read from the information recording medium by the pickup is accumulated in a track buffer section based on the difference between the reading bit rate Vr and the data transfer bit rate Vo from the track buffer section to the VBV buffer section. In a decoding model which handles data in units of GOPs, one GOP of data is accumulated in the track buffer section until the decoding processing is started as shown in part (a) of FIG. 8. Then, the data transfer is started to the VBV buffer section at a time 801. Accordingly, the data in the track buffer shown in part (a) of FIG. 8 is accumulated at the inclination of Vr before the data transfer is started. After the data transfer is started, the data is accumulated at the inclination of Vr-Vo. After the data transfer to the VBV buffer section is started, the data is accumulated in the VBV buffer section at the maximum bit rate of MPEG as shown in part (b) of FIG. 8. When the data amount corresponding to the leading frame is accumulated, one frame of data is given from the VBV buffer section to the decoding section provided in a later stage. Assuming that at this point, the data transfer from the VBV buffer section to the decoding section is performed instantaneously, the data amount in the VBV buffer section in part (b) of FIG. 8 (the amount of the data 810) is instantaneously reduced by one frame of data at a time 802 (decode start time). The one frame of data which is sent to the decoding section is decoded and output as a frame output (video signal) 820 after a prescribed delay time.

As described above, with the conventional decoding model, one GOP of data is accumulated in the track buffer section at the start of reproduction. Therefore, a long time 822 is required from when the data starts to be accumulated in the track buffer section (820; part (a) of FIG. 8) until the leading frame is output (part (c) of FIG. 8). This causes a problem in that it takes a long time from the start of reproduction of the data in the information recording medium until the video data is output.

Figure 9:
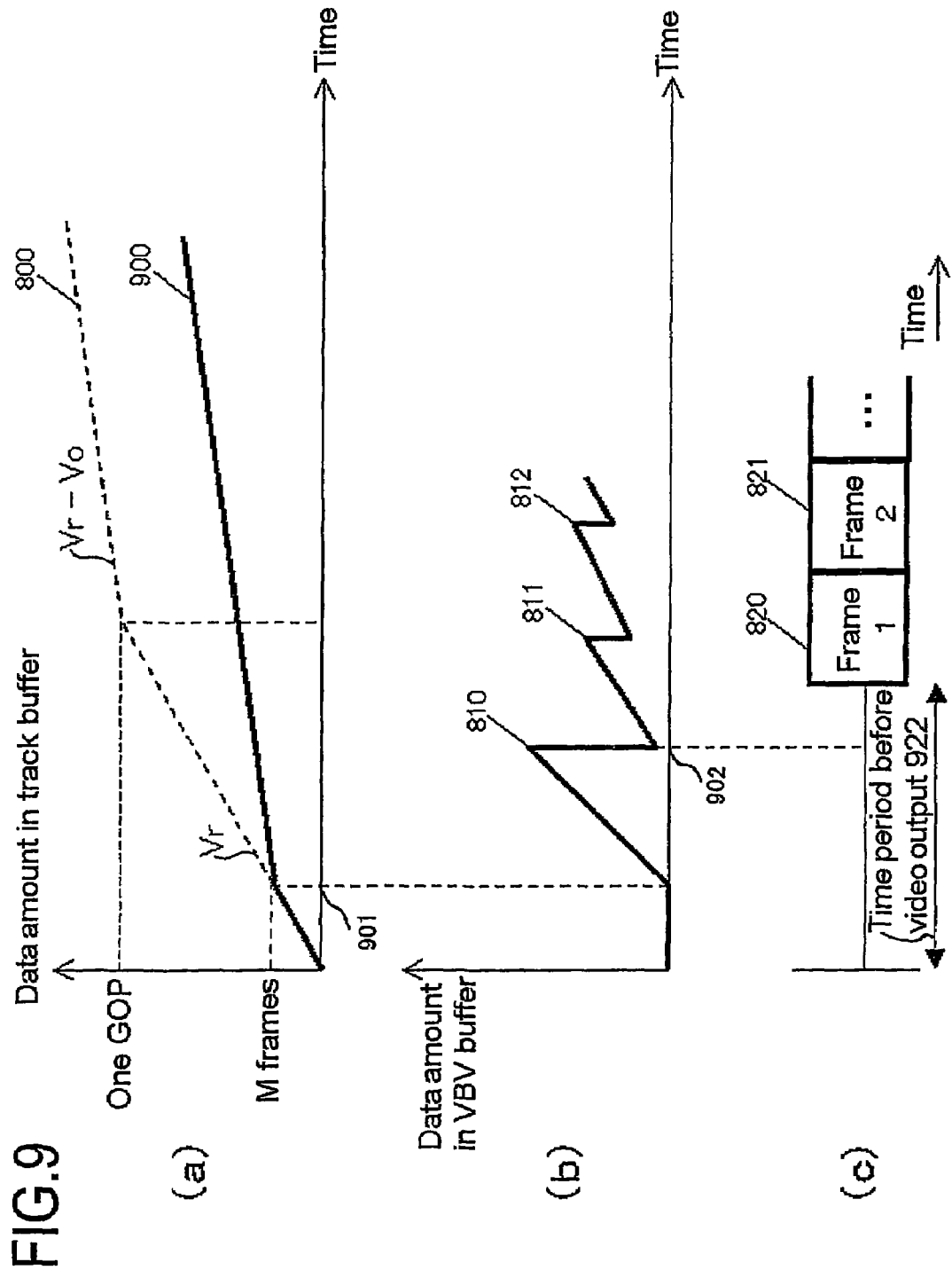
FIG. 9 shows output timing with a decoding model according to the present invention.

FIG. 9 shows a time period required for outputting video data with a decoding model according to the present invention. In part (a) of FIG. 9, the vertical axis represents the data amount in the track buffer section, and the horizontal axis represents the time. In part (b) of FIG. 9, the vertical axis represents the data amount in the VBV buffer section, and the horizontal axis represents the time. Part (c) of FIG. 9 shows a frame output from the decoding section in accordance with time (horizontal axis).

In FIG. 9, solid line 800 represents a change in the data amount in the track buffer section with the conventional decoding model. Solid line 900 represents a change in the data amount in the track buffer section with the decoding model according to the present invention. Data 810, 811 and 812 represent data corresponding to frame 1, frame 2 and frame 3 accumulated in the VBV buffer section, respectively. Data 820 and 821 respectively represent frame 1 and frame 2 among frame outputs from the decoding section.

As shown in part (a) of FIG. 9, the decoding model according to the present invention acts as follows. M frames are treated as one unit (M is an integer of 1 or larger). When one unit of data is accumulated in the track buffer section, the data transfer to the VBV buffer section is started. For example, it is assumed that M=3 frames. In this case, when three frame of data, i.e., frame 1, frame 2 and frame 3 are accumulated in the track buffer section (a time 901), the data transfer to the VBV section is started. At the time 901, the decoding processing is started. As can be appreciated by comparing part (c) of FIG. 8 and part (c) of FIG. 9, the decoding model according to the present invention provides an effect of shortening the time period required from the start of reproduction of the data in the information recording medium until the output of the video data.

In this example, M=3, but M may be any other integer as shown in part (c) of FIG. 10.

FIG. 10 shows a concept of a data structure in a GOP of the decoding model according to the present invention. Part (a) of FIG. 10 shows the GOP with the conventional decoding model and is provided for comparison with the decoding model according to the present invention. Part (b) of FIG. 10 shows an example of the decoding model of the present invention. More specifically, part (b) of FIG. 10 shows how the frames are formed into units when M=3. Part (c) of FIG. 10 shows a general embodiment of the decoding model of the present invention. More specifically, part (c) of FIG. 10 shows how the frames are formed into units when M is an integer of 1 or greater.

As shown in part (c) of FIG. 10, the decoding model of the present invention groups the frames into small groups (units) including an I frame or a P frame and subsequent B frames, in addition to grouping the frames based on the GOP as conventionally performed. For example, part (a) of FIG. 10 shows a group A00 having 15 frames as one GOP. According to the present invention, an I frame and the following plurality of B frames, among the 15 frames in the GOP, are collected as a unit A10. A P frame and the following plurality of B frames are collected as a unit A11. In a similar manner, frames are grouped into units A12, A13 and A14. An address of each unit on the information recording medium is placed in a table.

FIG. 11 shows a structure of a table B20 for managing frame data in a GOP grouped into units. FIG. 11 also shows a conventional table B10 for comparison. As can be appreciated from FIG. 11, the conventional table B10 stores the length and IPB identification information of each frame as address information. Therefore, the size of the table is increased to occupy a large memory area of the information recording medium. By contrast, the table B20 of the decoding model according to the present invention stores the length of each unit, the number of frames grouped into one unit, and the size information of the I or P frame as address information. Therefore, the size of the table is advantageously reduced. The table B20 is effective for special reproduction and editing as described below.

In special reproduction of, for example, search, or editing processing such as cut-editing, there can be a case where video data is reproduced from a frame in the middle of a GOP. In MPEG, in order to decode a specified B frame, the I frame or P frame which is related to the specified B frame needs to be decoded. The I frame or P frame required to be decoded is desired to be retrieved at high speed. According to the present invention, positional information exists which represents at which position the I frame or P frame is recorded. This shortens the time period for retrieving the frame.

The positional information of the I frame and P frame is indicated in the table B20 shown in FIG. 11. More specifically, the units are grouped into small units from an I frame or a P frame. Therefore, the address information of each unit is itself the positional information of the I frame or P frame. In this manner, the grouping of the frames into small units is effective in the special reproduction and editing.

Next, the maximum bit rate of MPEG will be described.

Figure 12:
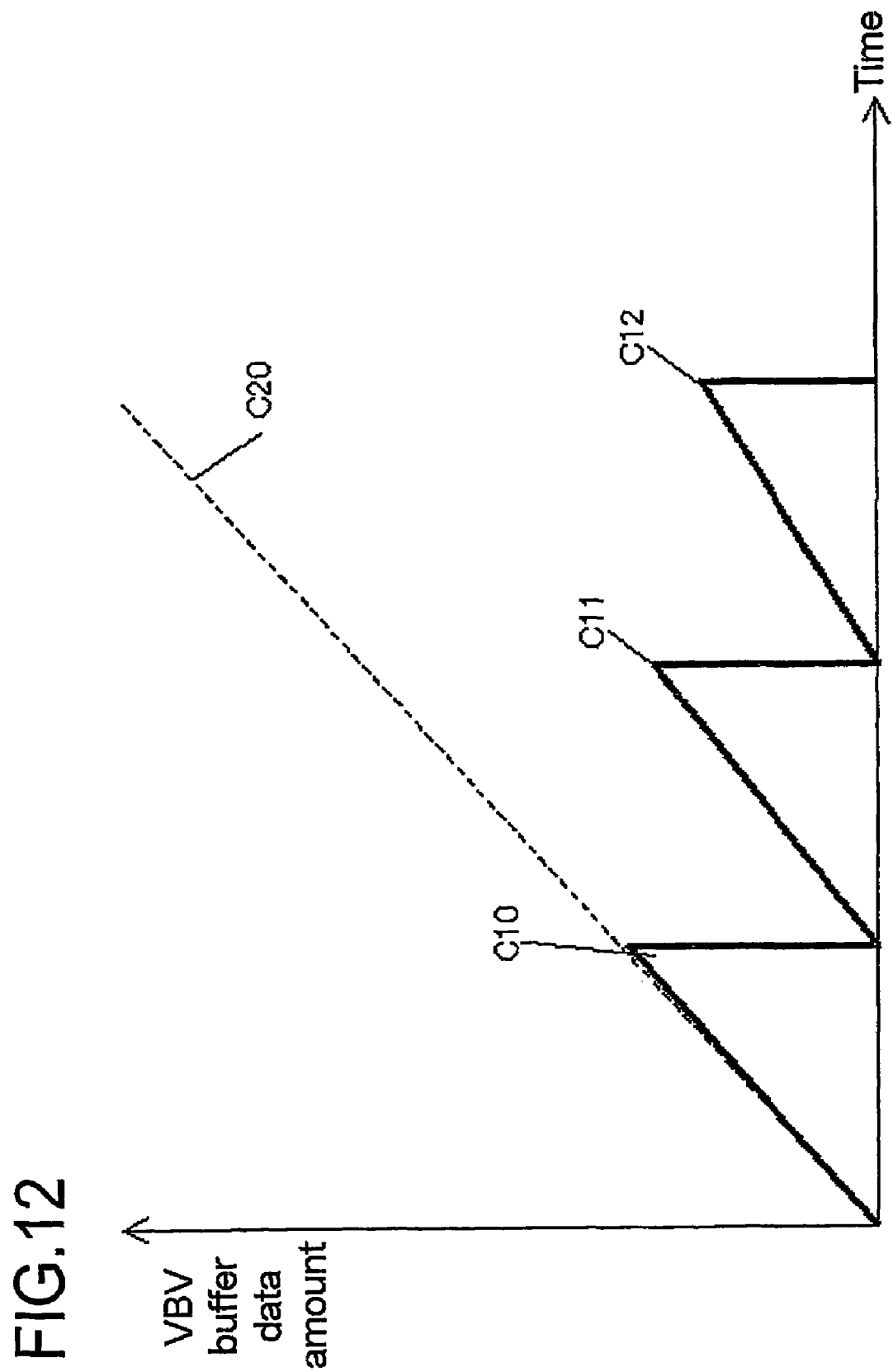
FIG. 12 shows a change in the data amount in a VBV buffer section in the conventional decoding model.

FIG. 12 shows a change in the data amount in the VBV buffer section according to the conventional decoding model. In FIG. 12, the vertical axis represents the data amount in the VBV buffer section, and the horizontal axis represents the time. A data amount C10 represents the data amount of the first frame, and a data amount C11 represents the data amount of the second frame. A data amount C12 represents the data amount of the third frame. The maximum bit rate C20 represents the maximum bit rate of this decoding model.

In the conventional decoding model, the bit rate at which the data is accumulated in the VBV buffer is restricted in the inclination represented by the maximum bit rate C20 in order to prevent the VBV buffer section from overflowing or underflowing. For this reason, even when a bit rate which is necessary to obtain the actual picture quality of a specific frame exceeds the maximum bit rate, the code amount in the frame needs to be reduced to reduce the inclination of the bit rate, in order to comply with the restriction. This means reducing the picture quality of the frame. Therefore, with the conventional decoding model, the actual picture quality cannot be obtained due to the restriction on the maximum bit rate.

Figure 13:
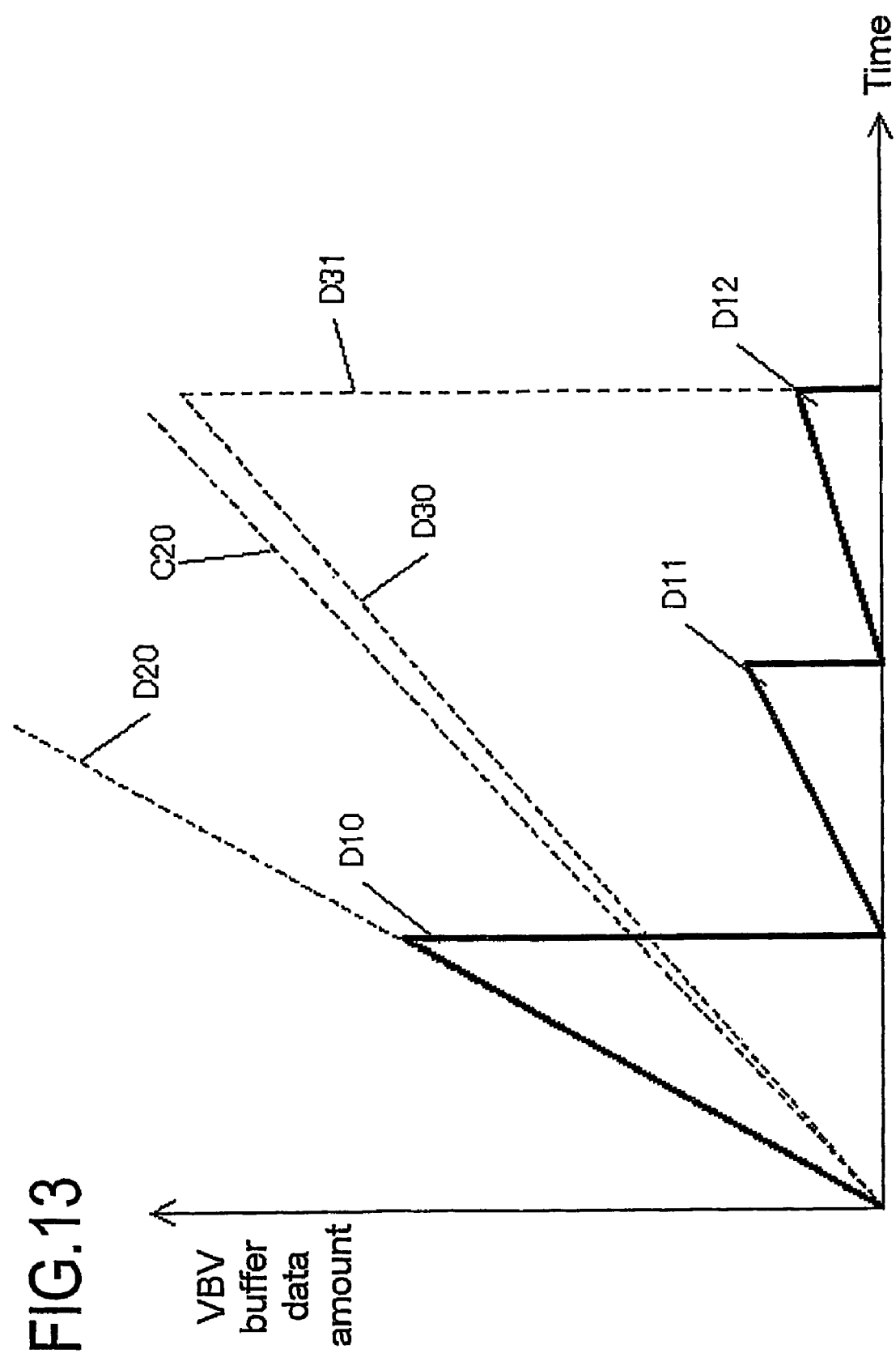
FIG. 13 shows a change in the data amount in a VBV buffer section in the decoding model according to the present invention.

FIG. 13 shows a change in the data amount in the VBV buffer section according to the decoding model of the present invention. In FIG. 13, the vertical axis represents the data amount in the VBV buffer section, and the horizontal axis represents the time. A data amount D10 represents the data amount of the first frame, and a data amount D11 represents the data amount of the second frame. A data amount D12 represents the data amount of the third frame. The maximum bit rate C20 represents the maximum bit rate of the conventional decoding model. The maximum bit rate D20 represents the maximum bit rate of the decoding model of the present invention. An average bit rate D30 is an average bit rate of three frames of the first through third frames. A total code amount D31 is the total code amount of the three frames of the first through third frames.

With the decoding model of the present invention, as described above with reference to FIG. 10, frames are grouped into small units from an I frame or P frame. Each frame includes subsequent B frames. In order to comply with the restriction on the maximum bit rate, the average bit rate of each unit is kept within the conventional maximum bit rate. One unit includes M frames (M is an integer of 1 or larger).

With reference to FIG. 13, an exemplary case where M=3 will be described. In FIG. 13, the first frame D10 has an inclination exceeding the conventional maximum bit rate C20. With the conventional decoding model, the inclination of the first frame D10 needs to be restricted to the conventional maximum bit rate C20. With the decoding model of the present invention, the average bit rate of one unit (three frames; M=3) is calculated. Namely, the total code amount D31 is the sum of the code amounts of the first frame D10, the second frame D11, and the third frame D12. The total code amount D31 is divided by three to obtain the average bit rate D30.

The average bit rate D30 is within the conventional maximum bit rate C20, and therefore the VBV buffer section does not overflow. The first frame D10 can have the maximum bit rate D20 exceeding the conventional maximum bit rate C20, and thus the actual picture quality can be provided.

Example 2

In a second example of the present invention, a data rearrangement method will be described with reference to FIGS. 18, 19, 20, 21 and 22. The data rearrangement method is executed by any one of the information recording and reproduction apparatus 663 (FIG. 15A), the recording apparatus 664 (FIG. 15B), and the editing apparatus 665 (FIG. 15C).

Figure 19:
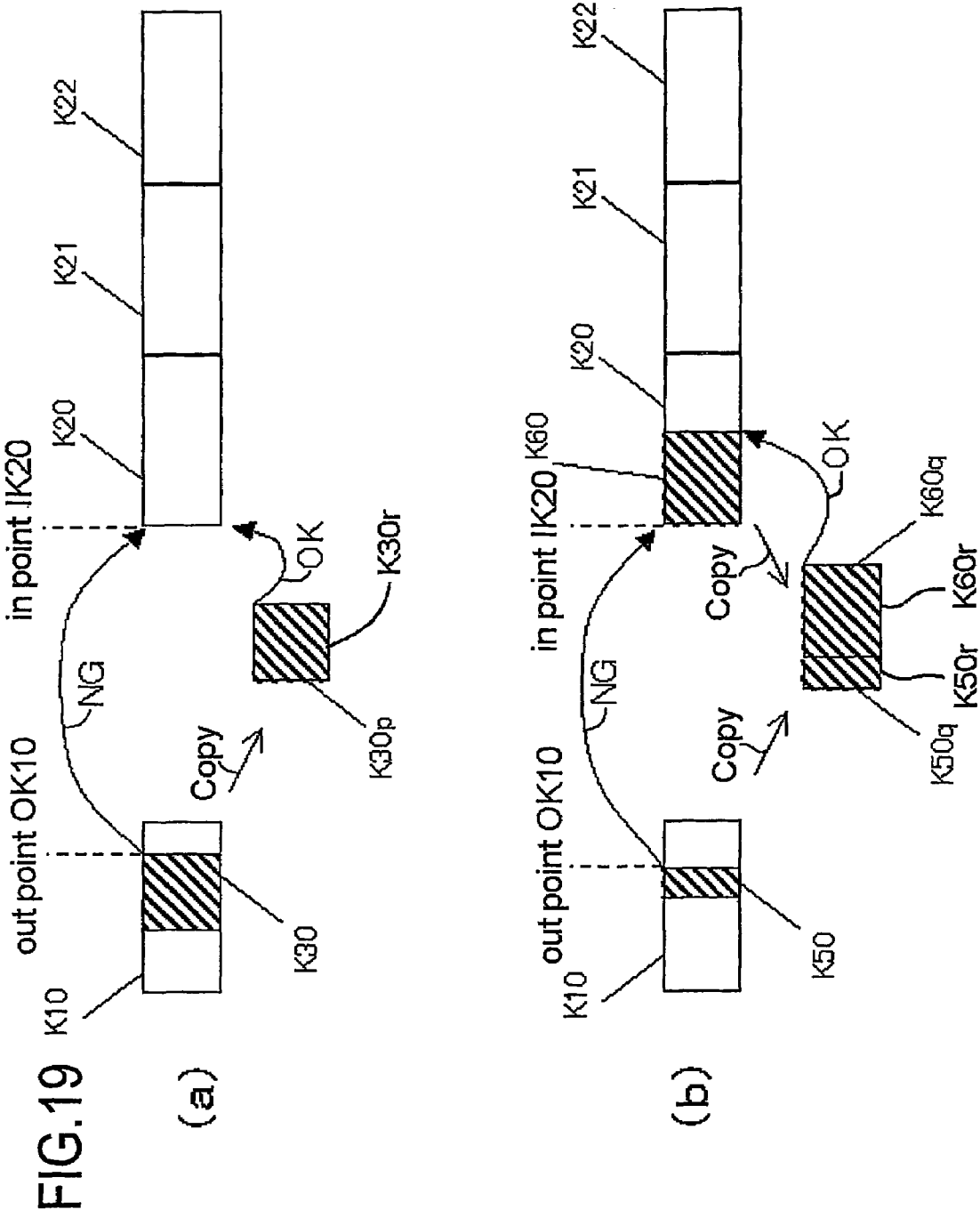
FIG. 19 shows rearrangement processing according to the present invention.

FIG. 19 shows rearrangement processing according to the present invention. Part (a) of FIG. 19 shows first rearrangement processing for rearranging one of (i) the data in which the "out" point is set and (ii) the data in which the "in" point is set. Part (b) of FIG. 19 shows second rearrangement processing for rearranging both of (i) the data in which the "out" point is set and (ii) the data in which the "in" point is set. By either processing, a plurality of pieces of real time data recorded on the information recording medium 600 are seamlessly reproduced without video or audio being interrupted even when a seek operation is performed for cut-editing. Hereinafter, the above-mentioned two types of rearrangement processing will be described.

Part (a) of FIG. 19 shows the first rearrangement processing according to the present invention. Real time data representing video or audio is recorded in a continuous recorded area K10. Real time data is recorded in continuous recorded areas K20, K21 and K22. The continuous recorded areas K20, K21 and K22 are in the same information recording medium 600 as the continuous recorded area K10, but are distanced therefrom. A continuous recorded area K30 represents an area to be reproduced, which is designated for the cut-editing. The continuous recorded area K30 is a part of the continuous recorded area K10. After the data in the continuous recorded area K30 is reproduced, the pickup performs a seek operation from the end of the continuous recorded area K30 to the beginning of the continuous recorded area K20 and continues reproducing the continuous recorded area K20 and thereafter. In the case where the seek distance is excessively long from the end of the continuous recorded area K30 to the beginning of the continuous recorded area K20, it is possible that seamless reproduction is determined to be impossible in the determination described above with reference to FIG. 14.

According to the first rearrangement processing of the present invention, an empty area is first searched for, from which an access time to the beginning of the continuous recorded area K20 on the information recording medium is short. This is set as a rearrangement area. Then, it is determined whether the rearrangement area (K30r in this example) is included in a seek range with which seamless reproduction is possible. The seek range can be obtained in advance by performing determination described with reference to FIG. 14. When the rearrangement area K30r fulfills the condition for seamless reproduction, the data recorded in the continuous recorded area K30 is copied to the rearrangement area and is set as data K30p. Owing to the rearrangement processing, the real time data shown in part (a) of FIG. 19 starts to be reproduced from the beginning of the data K30p. The pickup can perform a seek operation from the end of the data K30p to the beginning of the continuous recorded area K20 while performing seamless reproduction. Then, the data in the continuous recorded area K20 and thereafter is reproduced. In the description of the present invention, the term "copy" of data encompasses the "cut and paste" of data.

In part (a) of FIG. 19, an "out" point OK10 is set in the continuous recorded area K30, and an "in" point IK20 is set in the continuous recorded area K20. In the above, example, the continuous recorded area K30 in which the "out" point OK10 is set is rearranged since the continuous recorded area K30 is shorter than the continuous recorded area K20. In the case where the data in which the "in" point is set is shorter, such data may be rearranged.

Part (b) of FIG. 19 shows the second rearrangement processing according to the present invention. The continuous recorded areas K10, K20, K21 and K22 are substantially the same as those of part (a) of FIG. 19. A continuous recorded area K50 represents an area to be reproduced, which is designated for the cut-editing. The continuous recorded area K50 is a part of the continuous recorded area K10. The continuous recorded area K60 is a part of the continuous recorded area K20. After the data in the continuous recorded area K50 is reproduced, the pickup performs a seek operation from the end of the continuous recorded area K50 to the beginning of the continuous recorded area K60, i.e., the beginning of the continuous recorded area K20. Thus, the pickup continues reproducing the data in the continuous recorded area K20 and thereafter. In the case where the seek distance is excessively long from the end of the continuous recorded area K50 to the beginning of the continuous recorded area K20, it is possible that seamless reproduction is determined to be impossible in the determination described above with reference to FIG. 14.

According to the second rearrangement processing of the present invention, an empty area is first searched for, from an area closest to the continuous recorded area K20 on the information recording medium. This is set as a rearrangement area. Then, it is determined whether the rearrangement area (K50r in this example) is included in a seek range with which seamless reproduction is possible. The seek range can be obtained in advance by performing determination described with reference to FIG. 14.

When the rearrangement area K50r does not fulfill the condition for seamless reproduction, it is assumed that data recorded in the continuous recorded area K50, in which the "out" point OK10 is set, is to be copied to the rearrangement area K50r as shown in part (b) of FIG. 19.

The assumed copied data is set as K50q. It is further assumed that data recorded in the continuous recorded area K20, in which the "in" point IK20 is set, is to be copied to the rearrangement area K60r. The assumed copied data is set as K60q. By calculating the condition for seamless reproduction in the case where the data K50q and the data K60q are reproduced and the seek operation is performed to the end of the continuous recorded area K60, the size of the data K60q is obtained. In the case where the empty area as the rearrangement area is sufficiently large to store the data K50g and the data K60g, the data in the continuous recorded areas K50 and K60 is actually copied to the rearrangement areas K50r and K60r. In the case where the empty area as the rearrangement area is not sufficiently large, it is determined whether or not seamless reproduction is possible regarding the other empty areas. In this way, the real time data which is subjected to the cut-editing starts to be reproduced from the beginning of the data K50q. A sufficient data buffer amount has been accumulated when the data up to the end of the data K60q is reproduced. Using the remaining buffer data amount, a seek operation is performed from the end of the data K60q to the end of the continuous recorded area K60 while performing seamless reproduction. Then, the pickup continues to reproduce the data after the end of the continuous recorded area K60.

When short real time data as recorded in the continuous recorded area K50 is to be rearranged but a rearrangement area which realizes seamless reproduction is not found, the second rearrangement processing adds data to be rearranged from the continuous recorded area K20, and thus fulfills the condition for seamless reproduction.

In the above example, the continuous recorded area K50 is excessively small. In the case where the continuous recorded area K50 is excessively large, a portion thereof may be copied to the empty area, instead of the entirety thereof.

Figure 18:
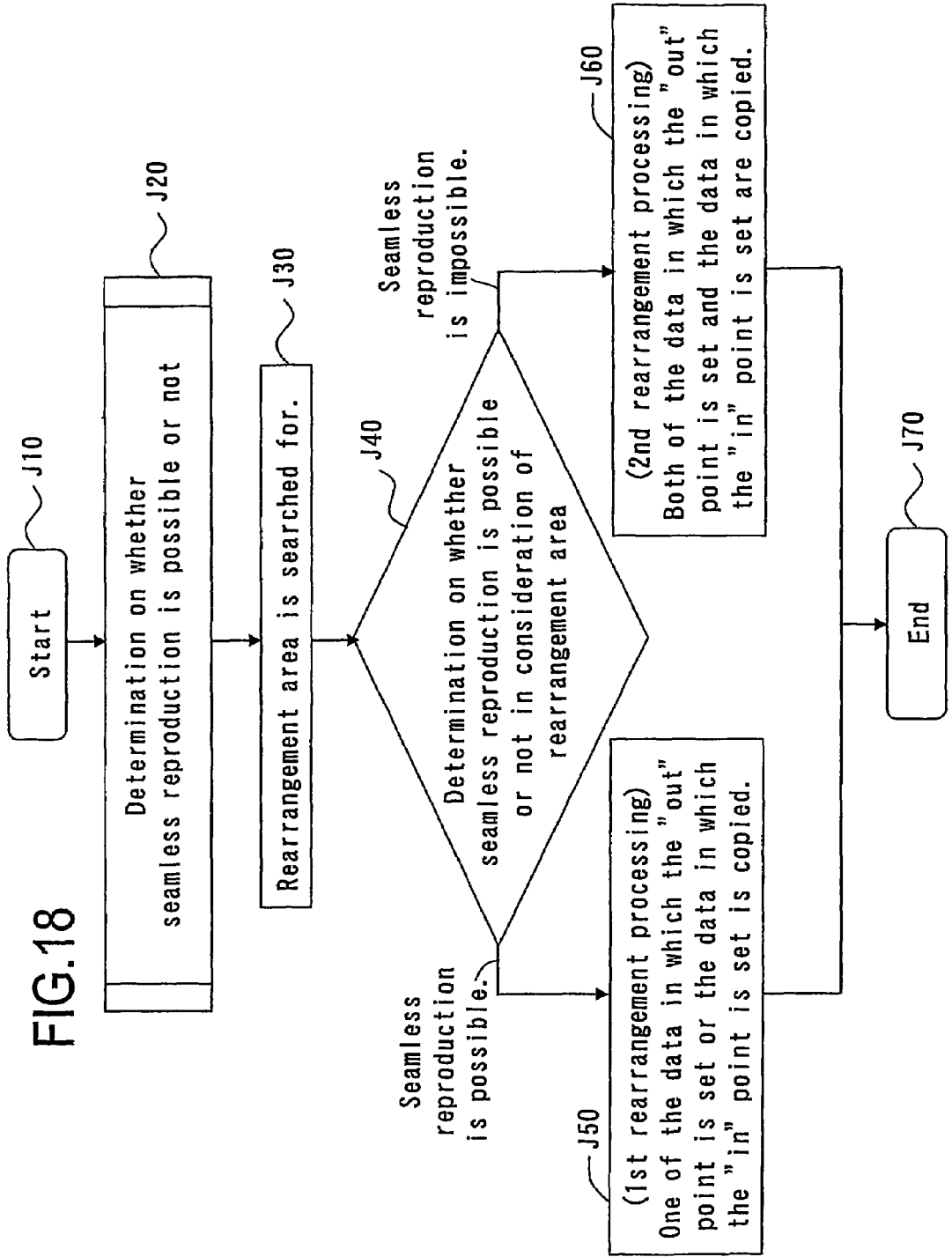
FIG. 18 is a flowchart showing rearrangement processing according to the present invention.

FIG. 18 is a flowchart showing rearrangement processing according to the present invention. The rearrangement processing begins in step J10. In step J20, it is determined whether seamless reproduction is possible or not. In step J30, a rearrangement area is searched for. In step J40, it is determined whether seamless reproduction is possible or not in consideration of the rearrangement area. In step J50, the first rearrangement processing is performed. In step J60, the second rearrangement processing is performed. The processing terminates at step J70.

In step J20, the procedure shown in FIG. 14 is performed. When it is determined that seamless reproduction is possible as shown in step E60 in FIG. 14, seamless reproduction is possible without performing further rearrangement processing.

When it is determined that seamless reproduction is impossible as shown in step E61 in FIG. 14, the processing goes to step J30 in FIG. 18, where an empty area usable as a rearrangement area is searched for. In step J20, a seek range with which seamless reproduction is possible can be obtained in advance. In step J40, it is determined whether the rearrangement area obtained in step J30 is within the seek range with which seamless reproduction is possible.

When the rearrangement area is determined to be within the range with which seamless reproduction is possible as the result of determination in step J40, the processing goes to step J50. Step J50 corresponds to a portion of the first rearrangement processing described above with reference to part (a) of FIG. 19. Namely, in step J50, the data is copied to the rearrangement area. Owing to this, when the processing is terminated in step J70, the data has been rearranged as the data K30p (part (a) of FIG. 19). Thus, seamless reproduction is possible.

When the rearrangement area is determined to be outside the range with which seamless reproduction is possible as the result of determination in step J40, the processing goes to step J60. Step J60 corresponds to a portion of the second rearrangement processing described above with reference to part (b) of FIG. 19. Both of (i) the data in which the "out" point is set and (ii) the data in which the "in" point is set are copied to the rearrangement area. Owing to this, when the processing is terminated in step J70, the data has been rearranged as the data K50p and data K60p (part (b) of FIG. 19). Thus, seamless reproduction is possible.

Figure 20:
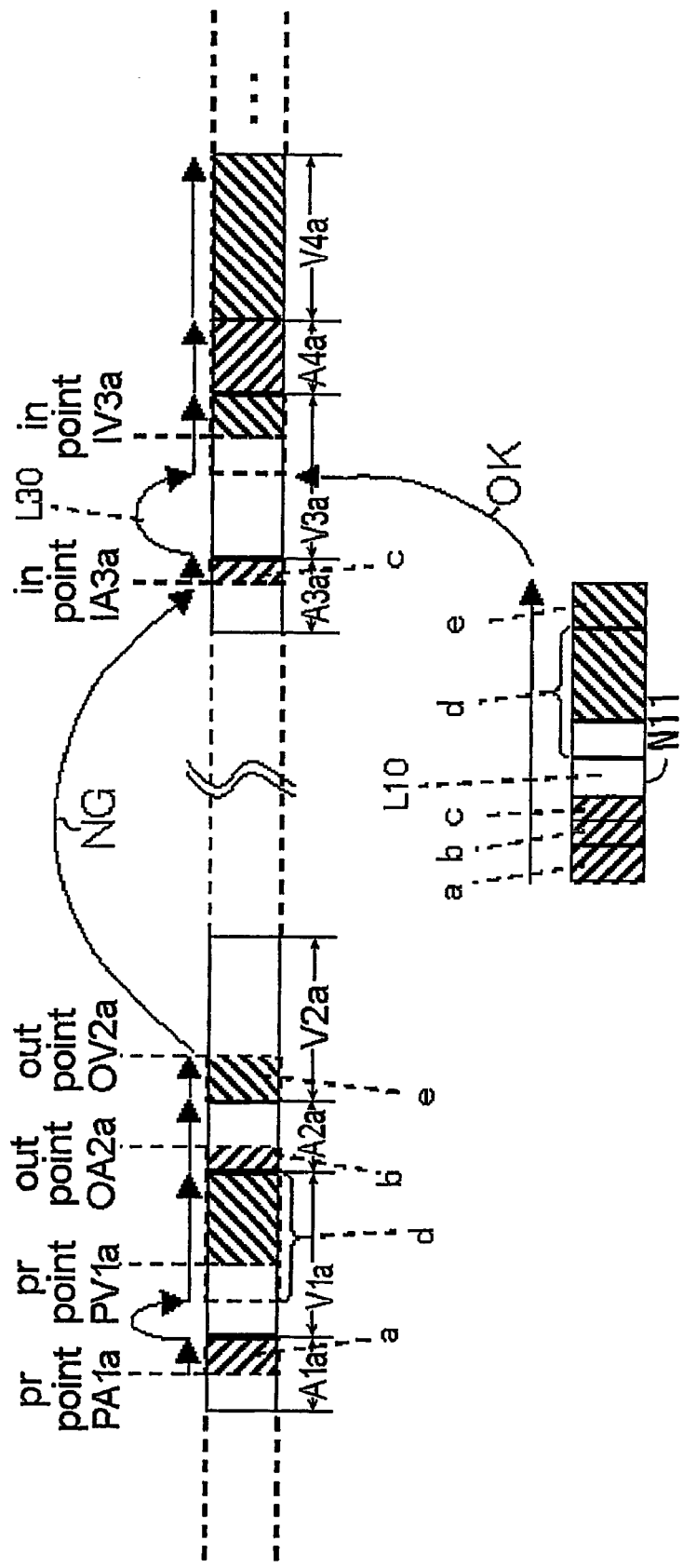
FIG. 20 shows first rearrangement processing according to the present invention.

FIG. 20 shows the first rearrangement processing according to the present invention in more detail. In FIG. 20, recorded areas A1a, A2a, A3a and A4a of audio data, and recorded areas V1a, V2a, V3a and V4a of video data, are arranged alternately on one information recording medium. The recorded area V2a and the recorded area A3a are distanced from each other on the information recording medium. As shown in FIG. 20, "pr" points PA1a and PV1a, "out" points OA2a and OV2a, and "in" points IA3a and IV3a are set for audio data and video data, respectively. The data from the "pr" point to the "out" point is reproduced, and without interruption, data after the "in" point is reproduced. In FIG. 20, the data actually used as video or audio is indicated with hatching.

FIG. 22 shows a recording state of the information recording medium 600. In FIG. 22, the information recording medium 600 includes a recorded area N10, a first empty area N11, and a second empty area N12. FIG. 22 also shows an enlarged view of a scope N20, which is a portion of the information recording medium 600 extending in a radial direction thereof. The enlarged view shows areas and recording states of the information recording medium 600.

The recorded areas A1a, A2a, A3a and A4a and the recorded areas V1a, V2a, V3a and V4a in FIG. 22 respectively correspond to those in FIG. 20. The recorded areas A1a, V1a, A2a and V2a are located inside the recorded area N1, and the recorded areas A3a, V3a, A4a and V4a are located outside the recorded area N10.

The data in the recorded areas inside the recorded area N10 is first reproduced, and after a seek operation, the data in the recorded areas outside the recorded area N10 is reproduced. As can be appreciated from FIG. 22, the recorded areas inside the recorded area N10 and the recorded areas outside the recorded area N10 are distanced from each other, and thus the seek operation requires some time. Therefore, seamless reproduction is not possible.

According to the first rearrangement processing, when seamless reproduction is impossible, a rearrangement area is searched for among empty areas in the information recording medium. In the case where the rearrangement area is within the seek range with which seamless reproduction is possible, one of (i) the data in which the "in" point is set or (ii) the data in which the "out" point is set, whichever is shorter is copied to the rearrangement area. In the example of FIG. 20, the data in which the "out" point is set, which is shorter, is copied (or rearranged). In the rearrangement area, the audio data and the video data are alternately arranged like in the other recorded areas.

Now it is assumed that in FIG. 22, an empty area N11 is found in the vicinity of the outer periphery of the recorded area N10. The empty area N11 is close to the outer periphery of the recorded area N10. Therefore, the empty area N11 is determined to be included in a seek range, which is defined from an outer periphery of the recorded area N10, with which seamless reproduction is possible. In such a case, the data recorded inside the recorded area N10 is rearranged to the empty area N11. Thus, seamless reproduction is possible.

In FIG. 20, audio data to be rearranged is audio data a recorded in the area from the "pr" point PA1a in the recorded area A1a to the end of the recorded area A1a, audio data b recorded in the area from the beginning of the recorded area A2a to the "out" point OA2a in the recorded area A2a, and audio data c recorded in the area from the "in" point IA3a in the recorded area A3a to the end of the recorded area A3a.

In the rearrangement area, the audio data is copied in the order of a, b and c. In the case where the total size of the data (a+b+c) is not the prescribed size, padding data L10 may be added. The prescribed size means a size by which the data is easily processed, for example, the size of ECC blocks in the information recording medium, the size of sectors in the information recording medium, the size by which video data and audio data are alternately located, the size of frames of the video data and audio data, or the size of compressed data.

The video data to be rearranged are video data d recorded in the area from a position slightly before the "pr" point PV1a in the recorded area V1a to the end of the recorded area V1a, and video data e recorded in the area from the beginning of the recorded area V2a to the "out" point OV2a in the recorded area V2a. The reason why the case where the video data d includes the data recorded in an area slightly before the "pr" point is that, as described with reference to FIG. 2, decoding of a specified frame in MPEG requires I frames or P frames located before the specified frame to be decoded beforehand. In consideration of this, the video data d includes the data of the frames before the "pr" point, which are required for decoding the frame in which the "pr" point is set. For the same reason, for reproducing the "in" point IV3a in the recorded area V3a, it is necessary to reproduce the data from the data recorded in an area slightly before the "in" point IV3a.

The audio data rearranged in this manner is located from the beginning of the empty area N11 with no empty space. Therefore, when the amount of the audio data is small, the recorded area of the audio data is small. The audio data and the video data rearranged in this manner are located with no empty space therebetween. Therefore, the seek time from the end of the audio data to the beginning of the video data can be reduced after the rearrangement.

As described above, the audio data and the video data are copied to the rearrangement area. Thus, seamless reproduction is made possible. Although not shown, padding data may be added, like the padding data L10, to the end of the rearranged video data e. Such a rearranged state is represented by the area N11 in FIG. 22. In the recorded areas A1p, A2p and A3p in FIG. 22, audio data a, b and a is recorded. In the recorded areas V1p and V2p, in FIG. 22, video data d and e is recorded.

The audio data c is a part of the longer data in the example of FIG. 20, and therefore does not need to be rearranged. However, without rearranging the audio data c, the pickup seeks to the "in" point IA3a in the recorded area A3a after the data in the rearrangement area is reproduced. Since there is a small distance between the recorded area A3a and the position slightly before the "in" point IV3a in the recorded area V3a (video data), there is a possibility that a short-distance fine seek operation L30 occurs. In the case where the audio data a is rearranged, the seek operation is performed to the position slightly before the "in" point IV3a in the recorded area V3a after the data in the rearrangement area is reproduced. Therefore, reproduction can be continued without the fine-seek operation L30 occurring. As described above, even when one of the two pieces of data needs to be rearranged, it is desirable to rearrange both pieces in the case of the audio data. This prevents generation of unnecessary fine-seek operation. This alleviates the condition for seamless reproduction, which increases the number of cases in which seamless reproduction is possible.

As described above with reference to FIG. 3, audio data includes a plurality of channels of data. When copying the audio data in the rearrangement processing shown in FIG. 20, only the audio data of a specific channel to be used can be copied to the rearrangement area, in order to realize seamless reproduction. Alternatively, the audio data of all the channels including the empty areas for unused channels (including empty data) can be copied. In this case, audio data can be additionally recorded in an unused area in the rearrangement area after the processing.

FIG. 21 shows the second rearrangement processing according to the present invention in more detail. The recorded areas A1a, A2a, A3a and A4a and the recorded areas V1a, V2a, V3a and V4a in FIG. 21 are respectively the same as those in FIG. 20.

FIG. 21 shows the rearrangement processing in the case where the rearrangement area retrieved from empty areas in the information recording medium is determined to be outside the seek range with which seamless reproduction is possible. This will be described with reference to FIG. 22. It is assumed that as a result of searching for an empty area in the vicinity of an outer periphery of the recorded area N10, other data has already been recorded in the area N11, and an empty area N12 is found. The empty area N12 is distanced from the outer periphery of the recorded area N10 and thus is determined to be outside the seek range with which seamless reproduction is possible, the empty area N12 being defined from an the periphery of the recorded area N10. In such a case, seamless reproduction is not realized merely by rearranging the data recorded inside the recorded area N10 to the empty area N12. In order to realize seamless reproduction, further data is rearranged to the empty area N12.

With reference to FIG. 21, the rearrangement area is determined to be outside the seek range with which seamless reproduction is possible. Therefore, seamless reproduction is not realized merely by copying one of (i) the data in which the "in" point is set and (ii) the data in which the "but" point is set, whichever is shorter. The longer data is also copied to the rearrangement area.

In FIG. 21, audio data to be rearranged is audio data a, audio data b, and audio data c.

In the rearrangement area, the audio data is copied in the order of a, b and a. In the case where the total size of the data (a+b+a) is not the prescribed size, padding data M10 may be added. The prescribed size is as described above.

The video data to be rearranged is video data d and audio data e.

In addition, video data f having a prescribed length is added as rearrangement data from a position slightly before the "in" point IV3a in the recorded area V3a.

Hereinafter, how much data amount is necessary for the video data f for realizing seamless reproduction will be described.

In FIG. 21, the video data e and video data f are not continuous to each other. As such, for data compressed with MPEG, a multiple decoder system as described with reference to FIG. 7 is required. The multiple decoder reproduction apparatus 622 shown in FIG. 7 includes the first decoding section 612 and the second decoding section 722. In FIG. 21, the video data d and video data e are continuous to each other, and thus are decoded by the first decoding section 612. The video data f is decoded by the second decoding section 722.

Part (b) of FIG. 21 represents the video data d, e and f in detail in units of GOP. Part (c) of FIG. 21 shows the remaining data amount in the second track buffer section 720 (FIG. 7). Reference numeral 210 represents a remaining data amount of the video data f when data read is finished. The video data f is decoded by the second decoding section 722.

As the condition for seamless reproduction of data to be rearranged, a condition under which the second buffer section 614 does not under flow will be described. Since the video data e to be decoded by the first decoding section 612 and the video data f to be decoded by the second decoding section 722 are continuously recorded in the rearrangement area, no seek operation occurs there between. Therefore, the video data e and the video data f are seamlessly reproduced using the multiple decoder model. In this example, how much of the data in the data decoded by the second decoding section 722 is to be rearranged will be found.

The second decoding section 722 processes video data f, not the video data d or e. Therefore, when data M30 and data M31 are reproduced from the information recording medium, the data is accumulated in the second track buffer section 720. The data M30 is frame data required to be decoded beforehand in order to decode the frame in which the "in" point is set. The data amount of the data M30 is V3pr. The bit rate of the data M30 (video data) is VdV3pr. The data M31 represents the data after the "in" point. The data amount of the data M31 is V3in. The bit rate of the data M31 (video data) is VdV3in. The time period required for reading the data M30 is TprV3. The time period required for reading the data M31 is TinV3+a×Ts. Letter "a" is the number of defective ECC blocks to be skipped in the video data. Ts is the time period required for skipping one ECC block. After the data M30 and M31 are read, a seek operation M20 is performed. Where the remaining buffer data amount in the second track buffer section 720 immediately before the seek operation M20, converted into the time, is TBUF, TBUF is represented by the following expression.

$$TBUF = V3pr/VdV3pr + V3in/VdV3in - (TprV3 + TinV3 + a \times Ts)$$

Now, the case where the seek operation M20 is performed from the end of the rearrangement data (i.e., the end of the rearranged video data f) to the end of the video data f in the recorded area V3a and then data M40 and data M41 are reproduced will be described. The data M40 is video data recorded from the position in the recorded area V3a, at which the end of the video data f is recorded, to the end of the recorded area V3a. The data M41 is audio data recorded in the recorded area A4a. In this example, the data M40 is shown. When most of the data in the recorded area V3a is rearranged, there is possibility that the amount of data remaining as the data M40 is very small. In such a case, after the seek operation M20, almost no video data is supplied by reproducing the data M40. There may be the case where after the seek operation M20, the audio data M41 is reproduced as it is. While the audio data M41 is being reproduced from the information recording medium, no video data is supplied and thus the remaining buffer data amount in part (c) of FIG. 21 continues decreasing. Under the circumstances, the access time from the rearrangement area, i.e., the access time from the end of the data M31 to the next video data, includes the seek time and the read time of the data M41, during which no video data is supplied. Where the time period required for the seek operation M20 is Tf, the time period required for reading one channel of audio data is TcA, the number of channels of audio data is N, and the number of defective ECC blocks to be skipped in the audio data is b, the seek time TACS from the end of the rearrangement area to the video data which is the destination of the eek operation is expressed by:

$$TACS = Tf + N \times TcA + b \times Ts.$$

The condition for realizing seamless reproduction from the rearrangement area is that the comparison result of TBUF and TACS is TBUF≧TACS. TBUF is the remaining buffer data amount in the second track buffer section 720 (part (c) of FIG. 21), which is converted into time, and TACS is the seek time from the end of the rearrangement area to the video data which is the destination of the seek operation. Therefore, the condition for realizing seamless reproduction from the rearrangement area is represented by the following expression.

$$V3pr/VdV3pr + V3in/VdV3in - (TprV3 + TinV3 + a \times Ts) \geq Tf + N \times TcA + b \times Ts$$

By finding a data amount V3in of the data M31 which fulfills the above expression, the data amount of the video data f to be rearranged (part (a) of FIG. 21) is obtained.

In the case where the data amount of the video data f obtained from the above expression is not the prescribed size, the data mount may be reduced in such a range as to fulfill the expression, so as to be the prescribed size. The prescribed size is as described above.

Such a rearranged state is represented by the area N12 in FIG. 22. In the recorded areas A1q, A2q and A3q in FIG. 22, audio data a, b and a in FIG. 21 are recorded, respectively. In the recorded areas V1q, V2q and V3q in FIG. 22, video data d, e and f in FIG. 21 are recorded, respectively.

As described above, the second rearrangement processing according to the present invention, when the rearrangement area is not included in the seek range with which seamless reproduction is possible, adds data to be rearranged to increase the data amount to be recorded in the rearrangement area. Thus, seamless reproduction is made possible.

In this example, the data M30 and data M31 have different bit rates. The reason is that it is considered that (i) the video data has a variable bit rate (VBR), and (ii) the bit rate of the data M30 and the bit rate of the data M31 are different because regarding the data M30, all the data in the GOP is not decoded but only the frames necessary to decode the frame in which the "in" point is set are decoded.

In part (c) of FIG. 21, the inclination of the remaining amount of the second track buffer section 720 is different for the data M30 and for the data M31. The reason is as follows. Regarding the data M30, all the data in the GOP is not decoded but only the frames necessary to decode the frame in which the "in" point is set are decoded. Therefore, data such as B frame which does not need to be decoded is erased in the second track buffer section 720, or abolished in the second decoding section 722 without being decoded. Thus, the data M30 is quickly consumed, and thus the difference between the amount of data consumed and the amount of data read from the information recording medium is reduced. As a result, the increasing rate of the remaining data amount becomes lower than that while the data M31 is read.

In the case where the video data M40 exists without being rearranged in the recorded area V3a in part (a) of FIG. 21, the audio data corresponding to the data M40 remains in the recorded area A3a. In this case, the pickup accesses from the end of the video data f in the rearrangement area to the remaining audio data in the recorded area A3a, and then accesses the data M40. Since there is a small distance between the recording position of the remaining data in the recorded area A3a and the recording position of the remaining data in the recorded area V3a, there is a possibility that a short-distance fine seek operation occurs. Thus, even when the video data M40 remains in the recorded area V3a, the audio data corresponding to the data M40 is included in the audio data a in the rearrangement area. Owing to this, the destination of the seek operation is the data N40 in the recorded area V3a after reproducing the data in the rearrangement area. Therefore, reproduction is continued seamlessly with no extra fine-seek being occurred. Even when the video data remains without being rearranged, the audio data corresponding to that video data is rearranged. As a result, generation of an extra fine-seek operation is prevented.

In part (a) of FIG. 21, the video data d and e are decoded by the first decoding section 612 (FIG. 7). The reading rate of the data from the information recording medium 600 is different from the decoding rate of the first decoding section 612. Therefore, when the video data d and e in the rearrangement area are read from the information recording medium 600, a slight amount of buffer data remains in the first track buffer section 610 in the first decoding section 612. Where the data remains in the first track buffer section 610, the time until the frame in which the "in" point is set can be delayed in accordance with the remaining amount. However, in the case where rearrangement processing as in FIG. 21 occurs, the video data d and e are often short. In such a case, the data amount remaining in the first track buffer section 610 is very small and is negligible. In this example, the elements of first track buffer section 610 are omitted from the expression representing the condition for seamless reproduction from the rearrangement area, in order to simplify the expression. In the case where more precise conditions are necessary, the calculation may be conducted in consideration of the above-mentioned remaining data amount in the first track buffer section 610.

In FIG. 20, video data corresponding to the audio data a may be rearranged when rearranging the audio data a in the recorded area A3a. As a result of this arrangement, audio data and video data corresponding to each other exist in the rearrangement area. Such data is easily synchronized, which facilitates the data editing in the rearrangement area.

For rearranging video data e and f discontinuous from each other in FIG. 20 or 21, such discontinuous data may be once decoded into frame data and again encoded. By re-encoding the encoded data such that the encoded data has a data size fulfilling the condition for seamless reproduction, seamless reproduction is made possible even by the single decoder apparatus as shown in FIG. 6.

According to one aspect of the present invention, a recording and reproduction apparatus is provided, including a reading section for reading first data and second data from an information recording medium; a first buffer section for temporarily accumulating the read first data; a second buffer section for temporarily accumulating the read second data; a first decoding section for outputting first decoded data generated by decoding the accumulated first data; a second decoding section for outputting second decoded data generated by decoding the accumulated second data; a first setting section for setting a read finish point of the first data; a second setting section for setting a read start point of the second data; and a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

According to another aspect of the invention, a recording apparatus for recording on an information recording medium at least one of first data and second data to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The recording apparatus includes a first setting section for setting a read finish point of the first data; a second setting section for setting a read start point of the second data; and a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

In one embodiment of the invention the recording apparatus further includes a writing section for writing, in the information recording medium, at least one of, at least a portion of the first data and at least a portion of the second data, wherein the control section controls the writing section so as to write in the information recording medium at least one of, at least a portion of the first data and at least a portion of the second data, such the length of the first time period is greater than or equal to the length of the second time period.

In one embodiment of the invention, the first data includes first audio data and first video data; the second data includes second audio data and second video data; and the control section controls the writing section such that the first audio data and the second audio data are recorded on the information recording medium adjacently to each other, and such that the first video data and the second video data are recorded on the information recording medium adjacently to each other.

According to still another aspect of the invention, an editing apparatus for editing at least one of first data and second data recorded on an information recording medium to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The editing apparatus includes a first setting section for setting a read finish point of the first data; a second setting section for setting a read start point of the second data; and a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

According to still another aspect of the invention, an information recording medium having first data and second data recorded thereon to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. A read finish point is set for the first data. A read start point is set for the second data. The first data and the second data are arranged such that a length of the first time period, from a start point of a seek operation of the reading section from the read finish point to the read start point until the first decoding section completes output of the first decoded data, is greater than or equal to a length of second time period, from the start point of the seek operation until the second decoded data is allowed to be output by the second decoding section.

According to still another aspect of the invention, a recording and reproduction method includes the steps of reading first data and second data from an information recording medium; temporarily accumulating the read first data; temporarily accumulating the read second data; outputting first decoded data generated by decoding the accumulated first data; outputting second decoded data generated by decoding the accumulated second data; setting a read finish point of the first data; setting a read start point of the second data; and calculating a first time period, from a start point of a seek operation from the read finish point to the read start point until output of the first decoded data is completed, and a second time period, from the start point of the seek operation until the second decoded data is allowed to be output; and comparing a length of the calculated first time period and a length of the calculated second time period.

According to still another aspect of the invention, a recording method for recording on an information recording medium at least one of first data and second data to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The recording method includes the steps of setting a read finish point of the first data; setting a read start point of the second data; and calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

In one embodiment of the invention, the recording method further includes the step of writing, in the information recording medium, at least one of, at least a portion of the first data and at least a portion of the second data, such that the length of the first time period is greater than or equal to the length of the second time period.

In one embodiment of the invention, the first data includes first audio data and first video data; the second data includes second audio data and second video data. The step of writing includes the step of recording at least one of the first audio data and the second audio data on the information recording medium such that the first audio data and the second audio data are adjacent to each other, and recording at least one of the first video data and the second video data on the information recording medium such that the first video data and the second video data are adjacent to each other.

According to still another aspect of the invention, an editing method for editing at least one of first data and second data recorded on an information recording medium to be reproduced by a reproduction apparatus is provided. The reproduction apparatus includes a reading section for reading the first data and the second data from the information recording medium; a first buffer section for temporarily accumulating the read first data; a second buffer section for temporarily accumulating the read second data; a first decoding section for outputting first decoded data generated by decoding the accumulated first data; and a second decoding section for outputting second decoded data generated by decoding the accumulated second data. The editing method includes the steps of setting a read finish point of the first data; setting a read start point of the second data; and calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

INDUSTRIAL APPLICABILITY

According to a recording and reproduction apparatus, a recording apparatus, an editing apparatus, an information recording medium, a recording and reproduction method, a recording method, and an editing method of the present invention, (i) a first time period, from a start point of a seek operation of a reading section from a read finish point to a read start point until a first decoding section completes output of first decoded data, (ii) and a second time period, from the start of the seek operation until second decoded data is allowed to be output by the second decoding section are calculated; and a length of the calculated first time period and a length of the calculated second time period are compared with each other. Based on the comparison result, it is determined whether or not seamless reproduction is possible. According to the present invention, the condition for seamless reproduction is determined in consideration of the delay time generated by the decoding processing of compressed video data, the variable bit rate, or the like. Therefore, whether or not seamless reproduction is possible can be determined accurately. The present invention providing such an effect is especially useful for a recording and reproduction apparatus, a recording apparatus, an editing apparatus, an information recording medium, a recording and reproduction method, a recording method, and an editing method, for seamlessly reproducing a plurality of pieces of real time data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

The invention claimed is:

1. A recording and reproduction apparatus, comprising:
a reading section for reading first data including video and audio data, and second data including video and audio data, from an information recording medium;
a first buffer section for temporarily accumulating the read first data;
a second buffer section for temporarily accumulating the read second data;
a first decoding section for outputting first decoded data including video and audio data generated by decoding the accumulated first data;
a second decoding section for outputting second decoded data including video and audio data generated by decoding the accumulated second data,
a first setting section for setting a read finish point of the first data;
a second setting section for setting a read start point of the second data; and
a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

2. A recording and reproduction apparatus according to claim 1, wherein the calculated first time period includes a time period which is obtained by subtracting a time period, required for reading data from a read start point of the first data to the read finish point of the first data, from a time period obtained by dividing a data amount from the read start point of the first data to the read finish point of the first data by a bit rate corresponding to the first data.

3. A recording and reproduction apparatus according to claim 1, wherein:
the first data includes a plurality of data portions between a read start point of the first data and the read finish point of the first data,
the plurality of data portions are each associated with a bit rate; and
the calculated first time period includes a time period which is obtained by subtracting a time period, required for reading data from the read start point of the first data to the read finish point of the first data, from a time period which represents a sum of a plurality of time periods, the plurality of time periods being obtained by dividing a data amount of each of the plurality of data portions by a bit rate corresponding to each of the plurality of data portions.

4. A recording and reproduction apparatus according to claim 3, wherein the bit rate associated with an m'th data portion among the plurality of data portions is different from the bit rate associated with an n'th data portion among the plurality of data portions, where m is an integer and n is an integer different from m.

5. A recording and reproduction apparatus according to claim 1, wherein:
the first data includes a plurality of data portions between a read start point of the first data to the read finish point of the first data, and
the calculated first time period includes a time period from when one of the plurality of data portions is input to the first decoding section until the first decoding section outputs decoded data which is generated by decoding the one of the plurality of data portions.

6. A recording and reproduction apparatus according to claim 5, wherein:
the first buffer section includes a track buffer section and a VBV buffer section, and
the calculated first time period includes a time period in which one of the plurality of data portions is accumulated in the VBV buffer section.

7. A recording and reproduction apparatus according to claim 1, wherein:
the first data includes a plurality of data portions from a read start point of the first data to the read finish point of the first data,
each of the plurality data portions is associated with a bit rate,
the first buffer section includes a track buffer section and a VBV buffer section,
where the calculated first time period is TA, TA is expressed by $$TA = \Sigma(V(i)/VdV(i)) - \Sigma(TR(i) + a(i) \times Ts) + TdlyA$$

where:
V(i) is a data amount of an i'th data portion among the plurality of data portions where i is an integer.
VdV(i) is a bit rate associated with the i'th data portion,
TR(i) is a time period required for reading the i'th data portion,
a(i) is a number of defective ECC blocks present in an area in the information recording medium where the i'th data portion is recorded, Ts is a time period required for skipping one ECC block, and TdlyA is a time period representing a sum of a time period, in which one of the plurality of data portions is accumulated in the VBV buffer section, and a time period from when the one of the plurality of data portions is input to the first decoding section until the first decoding section outputs decoded data which is generated by decoding the one of the plurality of data portions.

8. A recording and reproduction apparatus according to claim 1, wherein the calculated second time period includes:

a time period required for a seek operation of the reading section from the read finish point to the read start point, and a time period from when at least a portion of the second data is input to the second decoding section until the second decoding section outputs decoded data which is generated by decoding the at least a portion of the second data.

9. A recording and reproduction apparatus according to claim 8, wherein the calculated second time period includes a time period in which the at least a portion of the second data is accumulated in the second buffer section.

10. A recording and reproduction apparatus according to claim 5, wherein the calculated second time period includes:

a time period required for a seek operation of the reading section from the read finish point to the read start point, and a time period from when at least a portion of the second data is input to the second decoding section until the second decoding section outputs decoded data which is generated by decoding the at least a portion of the second data.

11. A recording and reproduction apparatus according to claim 10, wherein the calculated second time period includes a time period in which the at least a portion of the second data is accumulated in the second buffer section.

12. A recording and reproduction apparatus according to claim 1, wherein the calculated second time period includes:

a time period required for a seek operation of the reading section from the read finish point to the read start point, and a time period required for pre-decoding processing for obtaining prescribed data which is used for decoding data corresponding to the read start point of the second data.

13. A recording and reproduction apparatus according to claim 1, wherein where the calculated second time period is TB, TB is expressed by $$TB = Tf + Tb + TdlyB + Tin$$

where:

Tf is a time period required for a seek operation of the reading section from the read finish point to the read start point, Tb is a time period required for reading data which is readable during a period from the start point of the seek operation until data corresponding to the read start point is read, TdlyB is a time period representing a sum of a time period, in which at least a portion of the second data is accumulated in the second buffer section, and a time period from when the at least a portion of the second data is input to the second decoding section until the second decoding section outputs decoded data which is generated by decoding the at least a portion of the second data, and Tin is a time period required for pre-decoding processing for obtaining prescribed data which is used for decoding data corresponding to the read start point of the second data.

14. A recording and reproduction apparatus according to claim 7, wherein Where the calculated second time period is TB, TB is expressed by $$TB = Tf + Tb + TdlyB + Tin$$

where:

Tf is a time period required for a seek operation of the reading section from the read finish point to the read start point, Tb is a time period required for reading data which is readable during a period from the start point of the seek operation until the data corresponding to the read start point is read, TdlyB is a time period representing a sum of a time period, in which at least a portion of the second data is accumulated in the second buffer section, and a time period from when the at least a portion of the second data is input to the second decoding section until the second decoding section outputs decoded data Which is generated by decoding the at least a portion of the second data, and Tin is a time period required for pre-decoding processing for obtaining prescribed data which is used for decoding data corresponding to the read start point of the second data.

15. A recording and reproduction apparatus according to claim 1, further comprising a writing section for writing, in the information recording medium, at least one of, at least a portion of the first data and at least a portion of the second date, wherein:

when determining that the length of the calculated first time period is shorter than the length of the calculated second time period, the control section controls the writing section so as to change a recording position, in the information recording medium, of at least one of, at least a portion of the first data and at least a portion of the second data, such that the length of the first time period is greater than or equal to the length of the second time period.

16. A recording and reproduction apparatus according to claim 15, wherein the control section controls the writing section so as to change the recording position of one of the at least a portion of the first data and the at least a portion of the second data, which has a smaller data amount.

17. A recording and reproduction apparatus according to claim 15, wherein:

the first data includes first audio data and first video data;

the second data includes second audio data and second video data; and the control section controls the writing section such that the first audio data and the second audio data are recorded on the information recording medium adjacently to each other, and such that the first video data and the second video data are recorded on the information recording medium adjacently to each other.

18. A recording and reproduction apparatus according to claim 1, wherein the information recording medium is an optical medium.

19. A recording and reproduction apparatus according to claim 1, wherein the information recording medium is a semiconductor memory medium.

20. A recording apparatus for recording on an information recording medium at least one of first date and second data to be reproduced by a reproduction apparatus, the reproduction apparatus including:
  a reading section for reading the first data and the second data from the information recording medium;
  a first buffer section for temporarily accumulating the read first data;
  a second buffer section for temporarily accumulating the read second data;
  a first decoding section for outputting first decoded data generated by decoding the accumulated first data; and
  a second decoding section for outputting second decoded data generated by decoding the accumulated second data;
  the recording apparatus comprising:
  a first setting section for setting a read finish point of the first data;
  a second setting section for setting a read start point of the second data; and
  a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

21. A recording apparatus according to claim 20, further comprising a writing section for writing, in the information recording medium, at least one of, at least a portion of the first data and at least a portion of the second data, wherein the control section controls the writing section so as to write in the information recording medium at least one of, at least a portion of the first data and at least a portion of the second data, such the length of the first time period is greater than or equal to the length of the second time period.

22. A recording apparatus according to claim 21, wherein:
  the first data includes first audio data and first video data;
  the second data includes second audio data and second video data; and
  the control section controls the writing section such that the first audio data and the second audio data are recorded on the information recording medium adjacently to each other, and ouch that the first video data and the second video data are recorded on the information recording medium adjacently to each other.

23. An editing apparatus for editing at least one of first data and second data recorded on an information recording medium to be reproduced by a reproduction apparatus, the reproduction apparatus including:
  a reading section for reading the first data and the second data from the information recording medium;
  a first buffer section for temporarily accumulating the read first data;
  a second buffer section for temporarily accumulating the read second data;
  a first decoding section for outputting first decoded data generated by decoding the accumulated first data; and
  a second decoding section for outputting second decoded data generated by decoding the accumulated second data;
  the editing apparatus comprising:
  a first setting section for setting a read finish point of the first data;
  a second setting section for setting a read start point of the second data; and
  a control section for calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

24. An information recording medium having first data and second data recorded thereon to be reproduced by a reproduction apparatus, the reproduction apparatus including:
  a reading section for reading the first data and the second data from the information recording medium;
  a first buffer section for temporarily accumulating the read first data;
  a second buffer section for temporarily accumulating the read second data;
  a first decoding section for outputting first decoded data generated by decoding the accumulated first data; and
  a second decoding section for outputting second decoded data generated by decoding the accumulated second data;
  wherein:
  a read finish point is set for the first data,
  a read start point is set for the second data,
  the first data and the second data are arranged such that a length of the first time period, from a start point of a seek operation of the reading section from the read finish point to the read start point until the first decoding section completes output of the first decoded data, is greater than or equal to a length of second time period, from the start point of the seek operation until the second decoded data is allowed to be output by the second decoding section.

25. A recording and reproduction method, comprising the steps of:
  reading first data and second data from an information recording medium;
  temporarily accumulating the read first data;
  temporarily accumulating the read second data;
  outputting first decoded data generated by decoding the accumulated first data;
  outputting second decoded data generated by decoding the accumulated second data;
  setting a read finish point of the first data;
  setting a read start point of the second data; and
  calculating a first time period, from a start point of a seek operation from the read finish point to the read start point until output of the first decoded data is completed, and a second time period, from the start point of the seek operation until the second decoded data is allowed to be output; and comparing a length of the calculated first time period and a length of the calculated second time period.

26. A recording method for recording on an information recording medium at least one of first data and second data to be reproduced by a reproduction apparatus, the reproduction apparatus including:
  a reading section for reading the first data and the second data from the information recording medium;
  a first buffer section for temporarily accumulating the read first data;
  a second buffer section for temporarily accumulating the read second data;

a first decoding section for outputting first decoded data generated by decoding the accumulated first data; and a second decoding section for outputting second decoded data generated by decoding the accumulated second data;

the recording method comprising the steps of:

setting a read finish point of the first data;

setting a read start point of the second data; and calculating a first time period, from a start point of a seek operation of the reading section from the read finish point to the read start point until the first decoding section completes output of the first decoded data, and a second time period, from the start point of the seek operation until the second decoded data is allowed to be output by the second decoding section; and comparing a length of the calculated first time period and a length of the calculated second time period.

27. A recording method according to claim 26, further comprising the step of writing, in the information recording medium, at least one of, at least a portion of the first data and at least a portion of the second data, such that the length of the first time period is greater than or equal to the length of the second time period.

28. A recording method according to claim 27, wherein:

the first data includes first audio data and first video data;

the second data includes second audio data and second video data; and the step of writing includes the step of:

recording at least one of the first audio data and the second audio data on the information recording medium such that the first audio data and the second audio date are adjacent to each other, and recording at least one of the first video data and the second video data on the information recording medium such that the first video data and the second video data are adjacent to each other.

29. An editing method for editing at least one of first data and second data recorded on an information recording medium to be reproduced by a reproduction apparatus the reproduction apparatus including:

a reading section for reading the first data and the second data from the information recording medium;

a first buffer section for temporarily accumulating the read first data;

a second buffer section for temporarily accumulating the read second data;

a first decoding section for outputting first decoded data generated by decoding the accumulated first data; and a second decoding section for outputting second decoded data generated by decoding the accumulated second data;

the editing method comprising the steps of:

setting a read finish point of the first data;

setting a read start point of the second data; and calculating a first time period, from a start point of a seek operation of the reading section from the read finish point to the read start point until the first decoding section completes output of the first decoded data, and a second time period, from the start point of the seek operation until the second decoded data is allowed to be output by the second decoding sections and comparing a length of the calculated first time period and a length of the calculated second time period.

* * * * *

UNITED STATES PATENT AND TRADEMARK OFFICE
CERTIFICATE OF CORRECTION

PATENT NO. : 7,613,379 B2
APPLICATION NO. : 10/540631
DATED : November 3, 2009
INVENTOR(S) : Okada et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Nineteenth Day of October, 2010

David J. Kappos
*Director of the United States Patent and Trademark Office*